(12) United States Patent
Alhadeff et al.

(10) Patent No.: US 8,589,794 B2
(45) Date of Patent: *Nov. 19, 2013

(54) VIEW CONFIRMATION USING A CHALLENGE

(75) Inventors: Laurent Daniel Alhadeff, New York, NY (US); Richard Adam Smullen, New York, NY (US); Steven Peter Spencer, Livingston, NJ (US)

(73) Assignee: Genesismedia LLC., New York, NY (US)

( * ) Notice: Subject to any disclaimer, the term of this patent is extended or adjusted under 35 U.S.C. 154(b) by 245 days.

This patent is subject to a terminal disclaimer.

(21) Appl. No.: 13/216,256

(22) Filed: Aug. 24, 2011

(65) Prior Publication Data

US 2011/0307306 A1 Dec. 15, 2011

Related U.S. Application Data

(63) Continuation-in-part of application No. 12/544,233, filed on Aug. 20, 2009, which is a continuation-in-part of application No. 12/485,955, filed on Jun. 17, 2009.

(51) Int. Cl.
*G06F 3/00* (2006.01)
*G06F 3/048* (2013.01)

(52) U.S. Cl.
USPC ........... 715/719; 715/716; 715/835; 715/810; 715/962; 705/14.1; 705/14.4; 705/14.49

(58) Field of Classification Search
USPC ......... 715/700, 703, 716, 719, 733, 764, 765, 715/780, 781, 810, 835, 846, 864, 962; 705/1.1, 14.1, 14.12, 14.4, 14.49; 345/169, 173

See application file for complete search history.

(56) References Cited

U.S. PATENT DOCUMENTS

| 2006/0129458 A1* | 6/2006 | Maggio ......................... 705/14 |
| 2007/0020604 A1* | 1/2007 | Chulet ......................... 434/350 |
| 2008/0127249 A1* | 5/2008 | Cruice ......................... 725/34 |
| 2011/0191174 A1* | 8/2011 | Ibenforth et al. .......... 705/14.49 |

* cited by examiner

*Primary Examiner* — Xiomar L Bautista
(74) *Attorney, Agent, or Firm* — Ash Tankha; Lipton, Weinberger & Husick

(57) ABSTRACT

A computer implemented method and system is provided for confirming viewing of multimedia content on a client device. A challenge generator generates a challenge stream comprising multiple challenges, random in content. The challenge stream and the multimedia content stream are integrated in real time to generate a challenge in real time. The challenge is random in content and new each time the same multimedia content is played on one or more client devices. The challenge is presented to a viewer at random times during and/or after play of the multimedia content, and/or presented at random physical locations on the multimedia content, by overlaying the challenge on the multimedia content. A response for the presented challenge is invoked from the viewer, based on which a response report is generated. The viewer is credited with an item of value, if the response report confirms that the viewer viewed the multimedia content.

33 Claims, 25 Drawing Sheets

```
#include <iostream>
#include "bzChallengeGenerator.h"

using namespace std;

int main(int argc, char* argv[])
{
        bzChallengeGenerator generator;
        generator.ContentType(bzChallengeGenerator::NUMBERS);  // use
        numbers
        generator.ContentDisplaySize(20); // number will be displayed in a 20x20
        pixel square generator.VideoDisplayHeight(240); // video frame height is 240 pixels
        generator.VideoDisplayWidth(320); // video frame width is 320 pixels
        generator.VideoDuration(30); // video playing time is 30 secs bzChallenge c;
        int begin;
        begin = 0;
        cout << "Let's see how many we can randomly generate in sequence" <<
        endl;
        do
        {
                c = generator.Generate(begin);
                cout << c << endl;
                begin = c.Offset() + c.Duration();
        }
        while (begin <= (int)(generator.VideoDuration() -
bzChallengeGenerator::s_contentDuration));
        cout << "Let's generate a challenge for each 10 sec segment" << endl;
        cout << generator.Generate(0, 10) << endl;
        cout << generator.Generate(10, 20) << endl;
        cout << generator.Generate(20, 30) << endl;
        cout << endl << "Press RETURN to continue...";
        char x;
        cin.get(&x, 1);
        return 0;
}
```

FIG. 12A

```
#include <time.h>
#include "bzChallengeGenerator.h"

const char* bzChallengeGenerator::s_content[] =
{
        "0123456789",
        "ABCDEFGHJKLMNPQRTUVWXYZ",  // letters resembling numbers omitted: I O S
        "!@#$%^&*+-"
};
bzChallengeGenerator::bzChallengeGenerator(void)
{
        assert(s_contentDuration > 0);

m_contentType = NUMBERS;
        m_contentDisplaySize = 0;

m_videoDisplayWidth = 0;
        m_videoDisplayHeight = 0;
        m_videoDuration = 0;

// seed the rand() random number generator using the time
        time_t t;
        time(&t);
        srand((int)t);
}
bzChallengeGenerator::~bzChallengeGenerator(void)
{
}
```

FIG. 12B

```
bzChallenge bzChallengeGenerator::Generate(int begin, int end) const
{       begin = (begin < 0) ? 0 : begin;
        assert(begin <= (int)m_videoDuration);
        end = (end < 0) ? m_videoDuration : end;
        assert(end <= (int)m_videoDuration);
        int duration = end - begin;
        // validate parameters
        assert(duration >= s_contentDuration);
        assert(m_videoDisplayWidth >= m_contentDisplaySize);
        assert(m_videoDisplayHeight >= m_contentDisplaySize);
        bzChallenge c;
        int contentLen = strlen(s_content[m_contentType]);
        assert(contentLen > 0);
        // randomly select a character within the content type array
        c.m_content = s_content[m_contentType][RangedRand(0, contentLen - 1)];
        // randomly select an offset between begin and end, allowing time to display
the content
        c.m_offset = RangedRand(begin, end - s_contentDuration);
        // save the duration
        c.m_duration = s_contentDuration;
        // randomly select a horizontal position along the video width allowing space
to display the content
        c.m_xPosition = RangedRand(0, m_videoDisplayWidth -
m_contentDisplaySize);
        // randomly select a vertical position along the video width allowing space to
display the content
        c.m_yPosition = RangedRand(0, m_videoDisplayHeight -
m_contentDisplaySize);;
        return c;
}
int bzChallengeGenerator::RangedRand(int from, int to)
{
        return rand() % (to - from + 1) + from;
}
```

FIG. 12C

```
pragma once
#include <assert.h>
#include "bzChallenge.h"
class bzChallengeGenerator
{
public:
        bzChallengeGenerator(void);
        ~bzChallengeGenerator(void);

enum ContentTypeEnum // type of characters to display
        {
                NUMBERS = 0,
                LETTERS = 1,
                SYMBOLS = 2
        };
        // constant duration to display character during challenge (secs)
        static const unsigned int s_contentDuration = 3;

ContentTypeEnum ContentType() const { return m_contentType; }
        void ContentType(ContentTypeEnum c) { m_contentType = c; } unsigned int ContentDisplaySize() const { return m_contentDisplaySize; }
        void ContentDisplaySize(unsigned int n) { assert(n > 0);
m_contentDisplaySize = n; } unsigned int VideoDisplayWidth() const { return m_videoDisplayWidth; }
        void VideoDisplayWidth(unsigned int n) { assert(n > 0);
m_videoDisplayWidth = n; } unsigned int VideoDisplayHeight() const { return m_videoDisplayHeight; }
        void VideoDisplayHeight(unsigned int n) { assert(n > 0);
m_videoDisplayHeight = n; } unsigned int VideoDuration() const { return m_videoDuration; }
        void VideoDuration(unsigned int n) { assert(n > 0); m_videoDuration = n; }
        // this static method returns a random integer in the close interval [from, to]
        static int RangedRand(int from, int to);
```

FIG. 12D

```
        // this method generates a challenge, random in content, given the
properties specified
        bzChallenge Generate(int begin = -1, int end = -1) const;
private:
        // content type arrays
        static const char* s_content[];

// type of content to select character from
        ContentTypeEnum m_contentType; // type of characters to display in video
as challenge
        // character display area to be overlaid on image; square in pixels
        unsigned int m_contentDisplaySize; // display area (square) within video
frame to display char, in pixels
        // width of video display area
        unsigned int m_videoDisplayWidth;
        // height of video display area
        unsigned int m_videoDisplayHeight;
        // video's playing time
        unsigned int m_videoDuration;
};
```

FIG. 12E

```
#include "bzChallenge.h"

using namespace std;

std::ostream& operator<<(std::ostream& os, const bzChallenge& c)
{
        os << "Display '" << c.Content() << "' at offset " << c.Offset() << " secs for " << c.Duration() << " secs ";
        os << "at location (" << c.XPosition() << ", " << c.YPosition() << ")";

return os;
} bzChallenge::bzChallenge(void)
{
        m_content = 0;
        m_contentDisplaySize = 0;
        m_offset = 0;
        m_duration = 0;
        m_xPosition = 0;
        m_yPosition = 0;
} bzChallenge::~bzChallenge(void)
{
}
```

FIG. 12F

```
pragma once include <iostream>
//
// This class represents the challenge result returned by the Challenge Generator
//
class bzChallenge
{
friend class bzChallengeGenerator; // only this class can poke values public:
        bzChallenge(void);
        ~bzChallenge(void);

char Content() const { return m_content; }
        unsigned int Offset() const { return m_offset; }
        unsigned int ContentDisplaySize() const { return m_contentDisplaySize;
}
        unsigned int Duration() const { return m_duration; }
        unsigned int XPosition() const { return m_xPosition; }
        unsigned int YPosition() const { return m_yPosition; } private:
        char m_content; // content character to display
        unsigned int m_contentDisplaySize; // char display area in pixels
(square)
        unsigned int m_offset; // offset in secs into video when to display
        unsigned int m_duration; // how long to display char
        unsigned int m_xPosition; // pixel position along width
        unsigned int m_yPosition; // pixel position along height
};

std::ostream& operator<<(std::ostream& os, const bzChallenge& c);
```

FIG. 12G

RUN #1

LET'S SEE HOW MANY WE CAN RANDOMLY GENERATE IN SEQUENCE

DISPLAY "3" AT OFFSET 19 SECS FOR 3 SECS AT LOCATION (233, 8)

DISPLAY "2" AT OFFSET 26 SECS FOR 3 SECS AT LOCATION (29, 134)

LET'S GENERATE A CHALLENGE FOR EACH 10 SEC SEGMENT

DISPLAY "7" AT OFFSET 0 SECS FOR 3 SECS AT LOCATION (89, 16)

DISPLAY "2" AT OFFSET 15 SECS FOR 3 SECS AT LOCATION (58, 171)

DISPLAY "9" AT OFFSET 26 SECS FOR 3 SECS AT LOCATION (151, 109)

RUN #2

LET'S SEE HOW MANY WE CAN RANDOMLY GENERATE IN SEQUENCE

DISPLAY "6" AT OFFSET 10 SECS FOR 3 SECS AT LOCATION (60, 90)

DISPLAY "5" AT OFFSET 21 SECS FOR 3 SECS AT LOCATION (108, 116)

DISPLAY "3" AT OFFSET 26 SECS FOR 3 SECS AT LOCATION (274, 215)

LET'S GENERATE A CHALLENGE FOR EACH 10 SEC SEGMENT

DISPLAY "5" AT OFFSET 6 SECS FOR 3 SECS AT LOCATION (36, 119)

DISPLAY "6" AT OFFSET 10 SECS FOR 3 SECS AT LOCATION (150, 220)

DISPLAY "1" AT OFFSET 20 SECS FOR 3 SECS AT LOCATION (11, 43)

FIG. 13

VIEW CONFIRMATION USING A CHALLENGE

CROSS REFERENCE TO RELATED APPLICATIONS

This application is a continuation-in-part application of patent application Ser. No. 12/544,233 titled "Multimedia Content Viewing Confirmation", filed on Aug. 20, 2009 in the United States Patent and Trademark Office, which is a continuation-in-part application of non-provisional patent application Ser. No. 12/485,955 titled "Multimedia Content Viewing Confirmation" filed on Jun. 17, 2009 in the United States Patent and Trademark Office.

This application also claims the benefit of the following patent applications:
1. Provisional patent application No. 61/094,094 titled "An Audiovisual Material Supply System and Method", filed on Sep. 4, 2008 in the United States Patent and Trademark Office.
2. Provisional patent application No. 61/108,071, titled "An Audio Visual Matter Supply System and Method", filed on Oct. 24, 2008 in the United States Patent and Trademark Office.
3. Provisional patent application No. 61/117,668, titled "An Audiovisual Material Supply System And Method", filed on Nov. 25, 2008 in the United States Patent and Trademark Office.
4. Provisional patent application No. 61/162,393, titled "An Audiovisual Material Supply System and Method", filed on Mar. 23, 2009 in the United States Patent and Trademark Office.

The specifications of the above referenced applications are incorporated herein by reference in their entirety.

BACKGROUND

The computer implemented method and system disclosed herein, in general, relates to a viewer response system. More particularly, the computer implemented method and system disclosed herein relates to supplying multimedia content to a client device of a viewer and confirming that the entire multimedia content has been viewed by the viewer.

Media service providers can reach viewers of their media services through a wide spectrum of technologies and devices such as general packet radio service (GPRS), 3G or other internet-enabled cellular phones, computers with connection to the internet, and televisions with digital set top boxes. Using this outreach, media service providers earn revenue from product and service companies seeking to advertise their products and services through the media services. However, the efforts of the media service providers to advertise products and services may not achieve optimum results as the viewers may not view or may not be interested in viewing the multimedia content, for example, a video of the advertised products or services. This in turn reduces the outreach of companies seeking to advertise their products and services to potential customers through media services, and may lead to reduced revenue for both the companies that advertise their services through the media service providers, and for the media service providers. Also, product and service companies can not confirm whether the viewers viewed the advertisements, since the advertisements are delivered to remote devices. Current viewer measurement systems only provide passive viewer measurement based on whether the advertisement is played on the devices or not, but not based on whether the viewers have attentively viewed the advertisement.

Therefore, there is a need for a computer implemented method and system that enables media service providers to confirm that a viewer viewed multimedia content such as advertisements on a client device, and encourages the viewer to provide confirmation that the viewer viewed the multimedia content, which in turn increases the probability of the viewer purchasing a company's products or services.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above stated need for confirming that a viewer viewed the entire multimedia content on a client device, and for providing an incentive to the viewer to view the entire multimedia content. The computer implemented method and system disclosed herein can generally be used for confirming that a viewer viewed the entire multimedia content that is, for example, commercial, educational, and entertaining in nature. The computer implemented method and system disclosed herein encourages the viewer to provide confirmation that the viewer viewed the multimedia content, which in turn increases the probability of the viewer purchasing a company's products or services.

In the computer implemented method and system disclosed herein, viewing of the multimedia content is confirmed using a challenge-response mechanism. A multimedia content owner, for example, an advertiser, uploads multimedia content on a server of a media service provider. The client device of a viewer receives the multimedia content, for example, an advertisement, a commercial message, an educational clip, an entertainment clip, etc., from the server and plays the multimedia content on a display screen of the client device, for example, in an audiovisual format. As used herein, the client device is, for example, an internet-enabled mobile device, a computer with a web browser, a set top box capable of delivering interactive multimedia content, etc. The client device is capable of receiving the multimedia content in different multimedia content formats, for example, Windows® audio video format and other proprietary formats.

A challenge, random in content, is presented to the viewer on the viewer's client device by overlaying the challenge, random in content, on the multimedia content. Each time the same multimedia content is played sequentially or simultaneously on one or more client devices, a new challenge, random in content, is generated by a challenge generator in the client device and presented to the viewer on the client device. The challenge is one or more of random in content, presented at random times during and/or after the play of the multimedia content, and presented at random physical locations on the multimedia content. The challenge, random in content, comprises, for example, one or more of a random number, a random icon, a random shape, a product logo, a service logo, a random color, a random mathematical equation, and a random target on the display screen of the client device for the viewer to interact therewith using touch or a pointing device. In an embodiment, the challenge content is unrelated to the multimedia content. The challenge, random in content, changes for each viewing of the multimedia content. The challenge, random in content, is presented at one or more times during and/or after the play of the multimedia content. The duration of play of the multimedia content is determined and the challenge, random in content, is presented during and/or after the duration of play of the multimedia content.

In an embodiment, one or more challenges, random in content, are presented at one or more times during and/or after the play of the multimedia content. In an embodiment, a response to each of the challenges, random in content, from the viewer is transferred to one or more random locations on the display screen of the client device or on a multimedia player frame within the display screen of the client device, during the play of the multimedia content. Each response of the viewer is automatically registered on the display screen or the multimedia player frame at the end of play of the multimedia content.

The client device comprises the display screen, a view confirmation module, and a timer. The view confirmation module comprises a challenge generator, a challenge-response module, and a report generation module. In an embodiment, the challenge generator generates a challenge stream comprising multiple challenges. The content of each of the challenges in the challenge stream is random. The challenge-response module integrates, that is, combines the challenge stream and a stream of the multimedia content in real time to generate a challenge, random in content, in real time for each multimedia content play. The generated challenge is random in content each time the same multimedia content is played on one or more client devices. The challenge-response module generates the challenge, random in content, from the combined stream and presents the generated challenge, random in content, to the viewer to confirm that the viewer viewed the multimedia content played on the display screen of the client device. In an example, the challenge-response module displays the challenge, random in content, as an overlay on the multimedia content. The challenge, random in content, is characterized, for example, by being one or more of unrelated to the multimedia content, presented at random times during and/or after play of the multimedia content, and presented at random physical locations on the multimedia content.

One or more responses are invoked from the viewer for one or more presented challenges, random in content. The client device may locally determine whether the response(s) entered by the viewer for the presented challenge(s) is correct. If one or more of the responses entered by the viewer in the client device for the presented challenges, random in content, are correct, the responses confirms that the multimedia content was viewed by the viewer. The challenge-response interaction with the viewer is repeated using a new challenge, the content of which is random, if the response from the viewer to the presented challenge is incorrect. That is, if the viewer enters an incorrect response to a challenge, random in content, presented to the viewer, the viewer can replay the multimedia content that is presented with a new challenge, the content of which is random. A response report is generated based on the response from the viewer. The generated response report is transmitted to the server for confirming that the multimedia content was viewed.

In an embodiment, the challenge, random in content, is presented to the viewer by interrupting the play of the multimedia content after an interrupt time period. The interrupt time period is less than duration of the multimedia content. A timer is provided to begin counting the interrupt time period at the start of the play of the multimedia content. When the timer reaches the interrupt time period, the play of the multimedia content is interrupted to present the challenge, random in content, to the viewer.

The challenge, random in content, is presented in different forms such as a visual overlay on the multimedia content, or a child window cascading with the content rendering window, or parent window. For example, the challenge, random in content, comprises one or more random numbers presented at different points in time when the multimedia content is being played. The correct response in this example comprises reproduction of the random numbers by entering the random numbers into the client device. In an embodiment, the challenge comprises, for example, a random pair of geometrical shapes, a random mathematical equation, a random icon, a product logo or a service logo, a color, a target on a touch screen, etc., overlaid at random physical positions on the multimedia content. The correct response comprises, for example, a selection of an option representing a pair of geometrical shapes from an options list, entering the result of the mathematical equation into the client device, selection of an option representing an icon from an options list, selection of an option representing a product logo or a service logo from an options list, selection of an option representing a color from an options list, selection of or interaction with a target or response region on a touch screen, etc., respectively. In another embodiment, one or more challenges, random in content, are presented at different time intervals during the play of the multimedia content or at the conclusion of the play of the multimedia content.

The challenge, random in content, appears randomly on a multimedia player frame within the display screen of the client device. For example, the challenge, random in content, appears randomly on any four corners of the multimedia player frame. The challenge, random in content, also appears at a number of unique positions within the multimedia player frame based on physical coordinates selected within the multimedia player frame. The challenge, random in content, may also appear immediately outside a boundary of the multimedia player frame and scrolls in an upward direction or a downward direction on either side of the multimedia player frame. The challenge, random in content, also scrolls in a rightward direction or a leftward direction above or below the multimedia player frame.

A response for a challenge, random in content, is deemed correct, that is, viewing of the multimedia content is confirmed if the viewer provides the response within a response time-out period after the challenge, random in content, is presented. For example, a timer is provided to determine the time lapsed between the presentation of the challenge, random in content, and the submission of the response on the client device.

The response for a challenge, random in content, is invoked at any time during and/or after the multimedia content is played. For example, the viewer may be prompted to enter a response to the challenge, random in content, during the play of the multimedia content, or during and also at the end of the play of the multimedia content, or after the multimedia content is played.

In an embodiment, the client device downloads the multimedia content when the client device is connected to the server. In this embodiment, when the connection to the server is inactive, the client device renders the downloaded multimedia content in an off-line mode, performs a challenge-response interaction with the viewer, and generates and stores the response report. The off-line mode is triggered when the connection to the server is inactive. When a connection to the server is established via, for example, satellite, the network, etc., the response report is transmitted to the server over the connection. In another embodiment, the client device renders the multimedia content transmitted by the server as streaming multimedia content. In this embodiment, when the connection to the server is active, the client device renders the multimedia content in an online mode and performs a challenge-response interaction with the viewer. The response report generated after completing the challenge-response interaction is transmitted to the server over the active connection.

In an embodiment, the viewer is credited with an item of value, for example, cash, points redeemable for cash, points redeemable for additional items of value, scores, scores redeemable for cash, scores redeemable for additional items of value, discounts, access to premium multimedia content, units of virtual currency, cash payment, bill credit, coupons, special discounts on products or services, etc., if the response report confirms the multimedia content was viewed by the viewer, and the multimedia content owner is debited a fee. When the viewer successfully responds to one or more of the challenges, the correct or partially correct response to the challenge, random in content, indicates a confirmation that the multimedia content was viewed. In an embodiment, the viewer is eligible for an item of value even when one or more responses entered by the viewer are incorrect. In an embodiment, the viewer is eligible for an item of value for each correct response to a challenge, random in content, presented. Offering an item of value for a confirmed view provides an incentive to the viewer to view the entire multimedia content and respond to the challenge, random in content, presented during or after the play of the multimedia content. In another embodiment, the incentive is in the form of a redeemable credit score accumulated by the viewer over time. The credit score is redeemed, for example, with money, gifts, or any other item of value. The server is configured to receive the response report sent by the client device, and directs a payment module to credit an account of the viewer, for example, with a predetermined amount of money for a confirmed viewing of the multimedia content. In an embodiment, the response report is generated at the server.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

FIGS. 12A-12G exemplarily illustrate a C++ implementation of a challenge generator.

FIG. 13 exemplarily illustrates a sample output after executing test cases established for the challenge generator.

DETAILED DESCRIPTION OF THE INVENTION

Figure 1A:
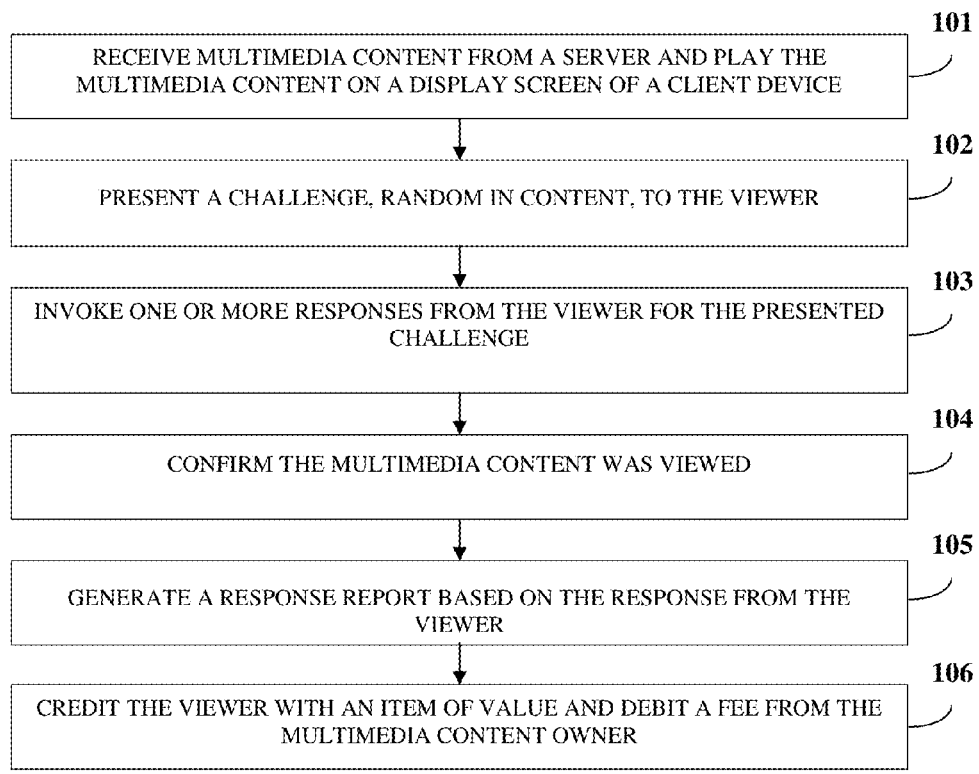
FIG. 1A illustrates a first embodiment of a computer implemented method for confirming that a viewer viewed multimedia content on a client device.
Figure 3:
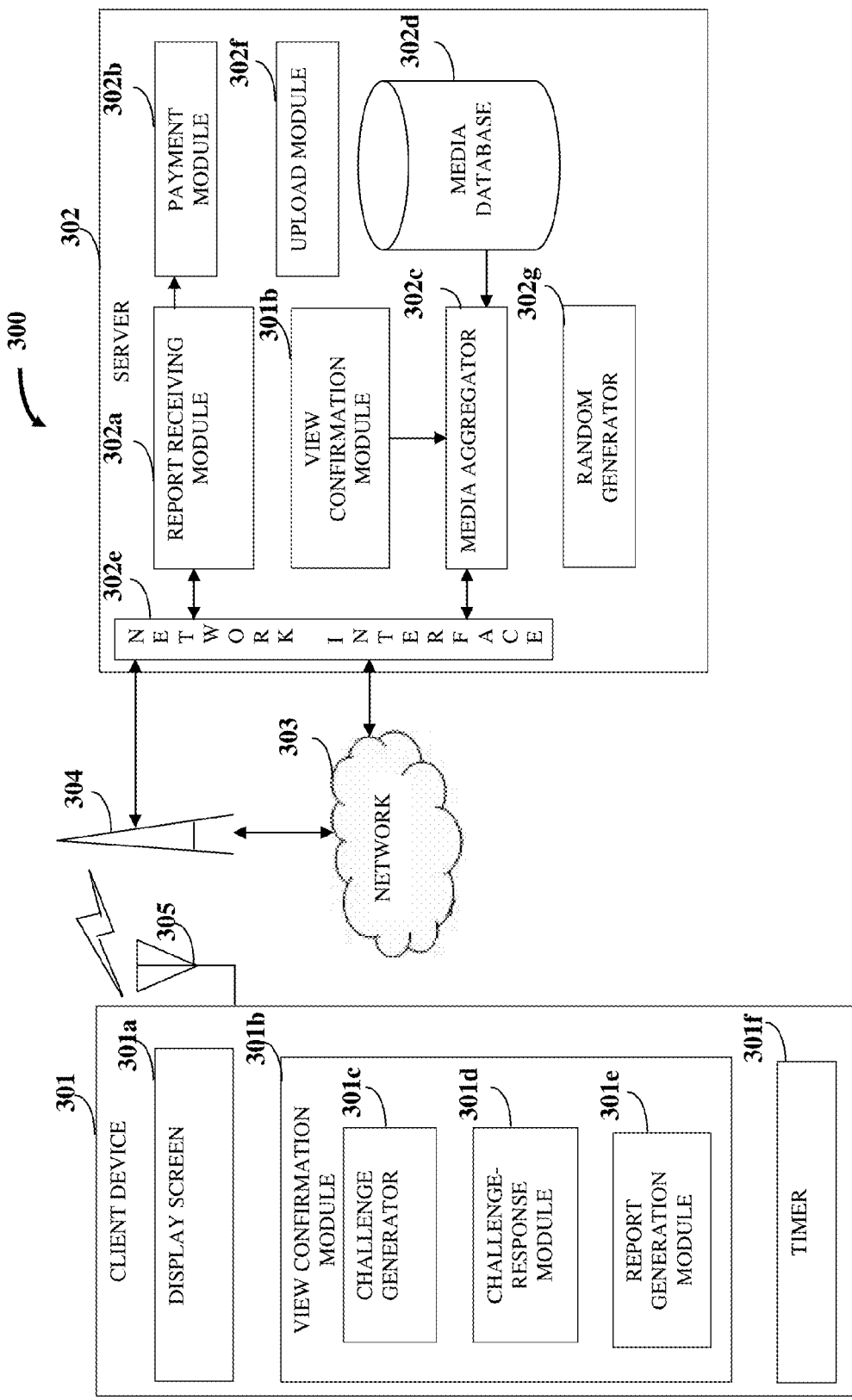
FIG. 3 illustrates a computer implemented system for confirming that a viewer viewed multimedia content on a client device.

FIG. 1A illustrates a first embodiment of a computer implemented method for confirming that a viewer viewed multimedia content on a client device 301 exemplarily illustrated in FIG. 3. As used herein, the term "multimedia content" refers to content in different combined and individual formats, for example, text, audio, video, audiovisual, still images, animations, and rich content formats. The computer implemented method and system 300 disclosed herein is used for promoting the viewing of multimedia content, for example, an advertisement clip of a product by providing an incentive to the viewer to view the multimedia content. The computer implemented method and system 300 can be used, in general, for confirming that the viewer viewed the multimedia content that is commercial, educational, and entertaining in nature.

In the computer implemented method disclosed herein, viewing of the multimedia content is confirmed using a challenge-response mechanism. The challenge-response is incorporated within the multimedia content available for consumption by the viewer on a client device 301 capable of connecting to a network 303 and capable of rendering multimedia content formats. As used herein, the client device 301 is, for example, an internet-enabled mobile device, a computer with a web browser, a set top box capable of delivering interactive multimedia content, etc.

The client device 301 possessed by the viewer is capable of establishing a client-server relationship with a server 302 via a network 303 as exemplarily illustrated in FIG. 3. The client device 301 may also download a client software module, for example, a view confirmation module 301b over the network 303 for making service requests to the server 302, while the server 302 addresses the service requests. The network 303 is, for example, a cellular network, the internet, a wireless network, a local area network, or any other network established using available networking protocols.

A multimedia content owner, for example, an advertiser, uploads multimedia content, for example, an advertisement, a commercial message, an educational clip, an entertainment clip, etc., on a server 302 of a media service provider. As used herein, the term "multimedia content owner" refers to an entity that generates multimedia content. Also, as used herein, "media service provider" refers to a service entity that provides the service of confirming that a viewer viewed multimedia content uploaded by the multimedia content owner on the server 302. The client device 301 of a viewer receives 101 the multimedia content from the server 302 and plays the multimedia content on a display screen 301a of the client device 301, for example, in an audiovisual format. The client device 301 is capable of receiving the multimedia content in different multimedia content formats, for example, the Windows® audio video format and other proprietary formats.

A new challenge, random in content, herein referred to as "challenge, random in content", is generated by a challenge generator 301c in the client device 301. The challenge generator 301c can generate a theoretically infinite number of new challenges, random in content, based on permutation and combination of the input to the challenge generator 301c and the challenge generation algorithm. The challenge, random in content, is presented 102 to the viewer by overlaying the challenge, random in content, on the multimedia content. The challenge, random in content, comprises, for example, one or more of a random number, a random icon, a random shape, a product logo, a service logo, a random color, a random mathematical equation, and a random target on the display screen 301a of the client device 301 for the viewer to interact therewith using touch or a pointing device. The challenge, random in content, is overlaid at different positions on the multimedia content. The challenge, random in content, is overlaid using technologies, for example, Adobe® Flash or other video creation standards. The streams comprising the challenge, random in content, and the multimedia content are integrated at either the server level or combined at a web browser on the client device 301 of the viewer. The challenge, random in content, and the multimedia content may arrive at the client device 301 of the viewer as a single integrated stream or as two independent streams that are combined in real time at the client device 301.

The content of the challenge is, for example, numbers, letters, shapes, phrases, etc., from a predefined set. The challenge is one or more of random in content, unrelated to the multimedia content, presented at random times comprising during play of the multimedia content, after the play of the multimedia content, and a combination thereof, and presented at random physical locations on the multimedia content. In an embodiment, the challenge content is unrelated to the multimedia content.

In an embodiment, the challenge is pseudorandom in content. A challenge, pseudorandom in content, involves the random selection of a limited set of challenge icons from a fixed data set, displayed at random times with certain defined boundaries, and at random physical placements within a display screen 301a. For example, the challenge, pseudorandom in content, involves a random selection of a number between 0-9; a random selection of a shape among, for example, a circle, square, triangle; a random selection of a letter within the alphabet, etc. Furthermore, the challenge, pseudorandom in content, comprises random placement of the randomly selected content, both in terms of time and space within the multimedia content. The pseudorandom placement of the challenge can define time boundaries. For example, a first challenge occurs between second "X" and second "Y" of the multimedia selected for play, while a second challenge occurs within 10 seconds of the end of the play. The two-dimensional space defined by the display screen 301a within which the challenge occurs can also be pseudorandom within fixed parameters. For example, the challenge, pseudorandom in content, appears in one of the four corners of the display screen 301a, each time a challenge, pseudorandom in content, is displayed, at a pseudorandom time.

In an embodiment, the randomness of the challenge content for space is implemented as follows. The placement of the challenge is made random by overlaying the challenge content at different locations in or around the multimedia content. The purpose of randomizing the placement of the challenge content is to prevent, for example, "ad blindness". "Ad blindness" as used herein results when the viewer focuses on a single physical spot within a multimedia player frame 1002 exemplarily illustrated in FIG. 10. As used herein, the multimedia player frame 1002 is a graphical output component of any media player application that plays the multimedia content in a defined region within the display screen 301a of the client device 301 as exemplarily illustrated in FIG. 10. The challenge, pseudorandom in content, appears randomly on the multimedia player frame 1002 within the display screen 301a of the client device 301. In an example, a challenge icon flashes randomly within one of the four corners of the multimedia player frame 1002 when a video is played. The viewer is encouraged to watch the entire video and not focus solely on a single physical spot within the video, since the location of the challenge icon is random. This allows the viewer to more completely view the content of the video to absorb the content of the video being played amidst the challenge-response interaction.

Figure 10:
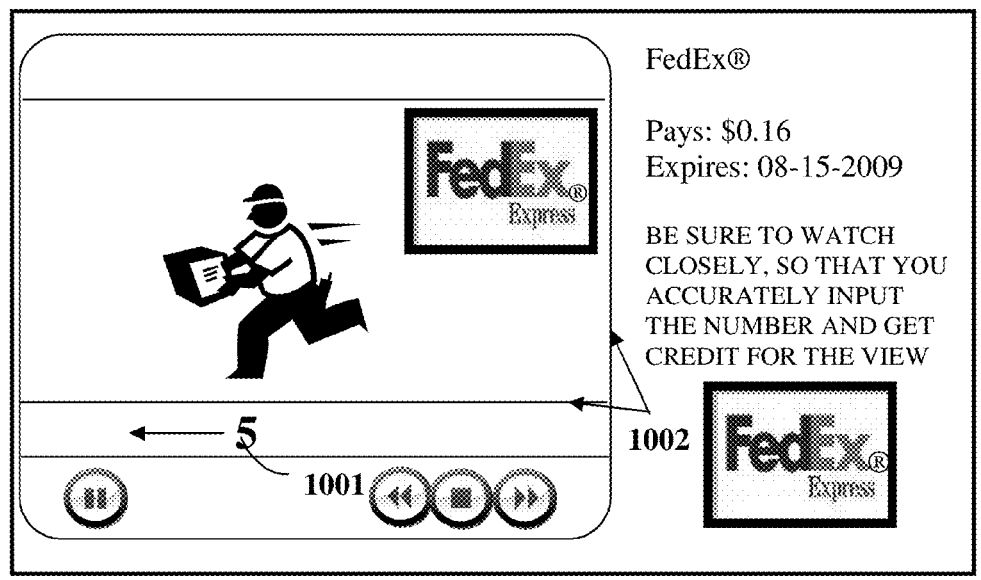
FIG. 10 exemplarily illustrates a screen shot for a scrolling challenge, random in content.

In another example, the challenge, random in content, appears immediately outside a boundary of the multimedia player frame 1002. The challenge icon, for example, scrolls in an upward direction or a downward direction on either side of the video immediately outside the boundary of the actual multimedia player frame 1002, or scrolls in a rightward direction or a leftward direction of the multimedia player frame 1002 in a region above or below the video, as exemplarily illustrated in FIG. 10. FIG. 10 exemplarily illustrates a screen shot for a scrolling challenge, random in content, for example, the numeral "5" 1001 moving in a leftward direction below the video. The direction in which the challenge icon scrolls as well as the position of the challenge icon relative to the multimedia player frame 1002 are random. For example, the challenge icon scrolls vertically up or vertically down in a region immediately left of the multimedia player frame 1002. In another example, the challenge icon scrolls horizontally right or left in a region immediately above the multimedia player frame 1002. The viewer is therefore required to watch the entire multimedia player frame 1002 in order to respond to the challenge icon. In another embodiment, the challenge icon scrolls diagonally within the multimedia player frame 1002 from one corner to the other.

In another example, the challenge icon is randomly displayed at any location within the multimedia player frame 1002. Physical coordinates, for example, X and Y coordinates for display of the challenge icon within the multimedia player frame 1002 are randomly selected by the challenge generator 301c. In this manner, the challenge icon can appear at a number of unique positions in a multimedia player frame 1002 depending on the possible combinations of the X and Y coordinates selected within the multimedia player frame 1002.

In an embodiment, the client device 301 receives a list of multimedia content from the server 302 for selection by the viewer. The multimedia content selected by the viewer is rendered on the display screen 301a of the client device 301, and the duration of play of the selected multimedia content is determined. A challenge, random in content, is presented at one or more points in time by overlaying the challenge, random in content, on the rendered multimedia content. For example, the challenge, random in content, is presented for N seconds, after L seconds elapse with an audio-video clip of duration M seconds, wherein L is less than M. The challenge, random in content, is presented at one or more times during and/or after the duration of the play of the multimedia content. The challenge, random in content, changes for each viewing of the multimedia content. The challenge generator 301c in the client device 301 generates a challenge, random in content, and presents the challenge, random in content, to the viewer on the client device 301, each time the same multimedia content is played sequentially or simultaneously on one or more client devices 301.

One or more responses are invoked 103 from the viewer for the presented challenge, random in content. A response may be invoked from the viewer during or at the end of play of the multimedia content. If the viewer enters the response to the presented challenge, random in content, the response confirms 104 that the multimedia content was viewed by the viewer. The viewer may enter a response to the challenge, random in content, during the play of the multimedia content, and optionally during and after the multimedia play, and optionally after the multimedia play. Additionally, the view confirmation module 301b in the client device 301 locally determines whether the response entered by the viewer for the presented challenge is correct by correlating the response with the challenge, random in content. A response report is generated 105 based on the response from the viewer. The generated response report is transmitted to the server 302 confirming that the multimedia content was viewed by the viewer. In an embodiment, the response report is generated on the server 302.

In an embodiment, if the response from the viewer for the presented challenge is incorrect, the viewer can replay the multimedia content which will present another new challenge, random in content. The challenge generator 301c in the client device 301 generates a new challenge, random in content, each time the same multimedia content is played sequentially or simultaneously on one or more client devices 301. The steps of rendering the viewer selected multimedia content, presenting a challenge, random in content, invoking a response, and generating a response report may be repeated for other multimedia content in the list depending on the selection of the viewer.

The challenge, random in content, is presented in different forms, for example, a visual overlay on the multimedia content, or a child window cascading with the content rendering window. For example, the challenge, random in content, is presented as a graphical user interface (GUI) widget. In another example, the challenge, random in content, is a short audio message introduced briefly into the visual-only media content. The randomness in the challenges is due to the randomness in visual elements presented in the challenges as well as the responses that the challenges elicit during or after the multimedia content is played. For example, the challenge, random in content, comprises one or more random numbers flashed at different points in time when a multimedia content is being played. The correct response in this example comprises reproduction of the random numbers by entering the random numbers into the client device 301. The response is verified by comparing the numbers entered by the viewer with the numbers flashed in the multimedia content. The challenge, random in content, further comprises, for example, one or more random geometrical shapes presented at different points in time, a random mathematical equation, a random icon, a product logo or a service logo, a color, a target on a touch-sensitive screen that the viewer has to touch, a target that is pointed at by a pointing device, etc. In these examples, the correct response comprises a selection of an option representing the geometrical shapes from an options list, entering the result of the mathematical equation into the client device 301, selection of an option representing an icon from an options list, selection of an option representing a product logo or a service logo from an options list, selection of an option representing different colors from an option list, selection or interaction with the target on a touch-sensitive screen, etc., respectively.

In an embodiment, one or more challenges, random in content, are presented at one or more times or at different time periods, during or after the multimedia content is played. For example, the first challenge is presented half way through the play of a multimedia clip and the second challenge is presented at the end of the multimedia clip.

The viewer is requested to provide a response to the challenge, random in content, on the client device 301 within a predetermined period of time after the challenge, random in content, is presented. A response for a challenge, random in content, is deemed valid if the viewer provides the correct response within a response time-out period after the challenge, random in content, is presented. A timer 301f is provided to determine the time lapsed between the presentation of the challenge, random in content, and the submission of the response.

In an embodiment, the viewer is credited 106 with an item of value, for example, cash, if the response report confirms the multimedia content was viewed by the viewer, while the multimedia content owner is debited a fee for the service provided to the multimedia content owner by the media service provider of the multimedia content. The item of value comprises, for example, one or more of points, points redeemable for cash, points redeemable for additional items of value, scores, scores redeemable for cash, scores redeemable for additional items of value, cash, discounts, access to premium multimedia content, units of virtual currency, cash payment, bill credit, coupons, special discounts on products or services, access to desired multimedia content from the server 302, and any combination thereof. When the viewer's response to the challenge, random in content, is correct or partially correct where more than one challenge, random in content, is presented to the viewer, the correct response or the partially correct response to the challenge, random in content, confirms that the multimedia content was viewed. In an embodiment, the viewer is optionally eligible for an item of value even when one or more responses entered by the viewer are incorrect. In an embodiment, where the number of challenges, random in content, presented is more than one, the viewer is eligible for an item of value for each correct response.

Compensating the multimedia content viewer with an item of value for a confirmed view provides an incentive to the viewer to view the entire multimedia content and respond to the challenge, random in content, which is presented during and/or after the play of the multimedia content. In an embodiment, the incentive is in the form of a redeemable credit score accumulated by the viewer over time. For example, offering an incentive to the viewer to respond to the challenge, random in content, presented within an advertisement clip generates interest in a potential buyer to view the entire advertisement clip, thereby promoting the service or product advertised in the multimedia content. In an embodiment, the incentive is in the form of a redeemable credit score accumulated by the viewer over time. The credit score is redeemed, for example, with money, gifts, or any other items. The server 302 is configured to receive the response report sent by the client device 301, and directs a payment module 302b to credit an account of the viewer with an item of value, for example, a predetermined amount of money for the confirmed view. In an embodiment, the response report is generated at the server 302.

Figure 1B:
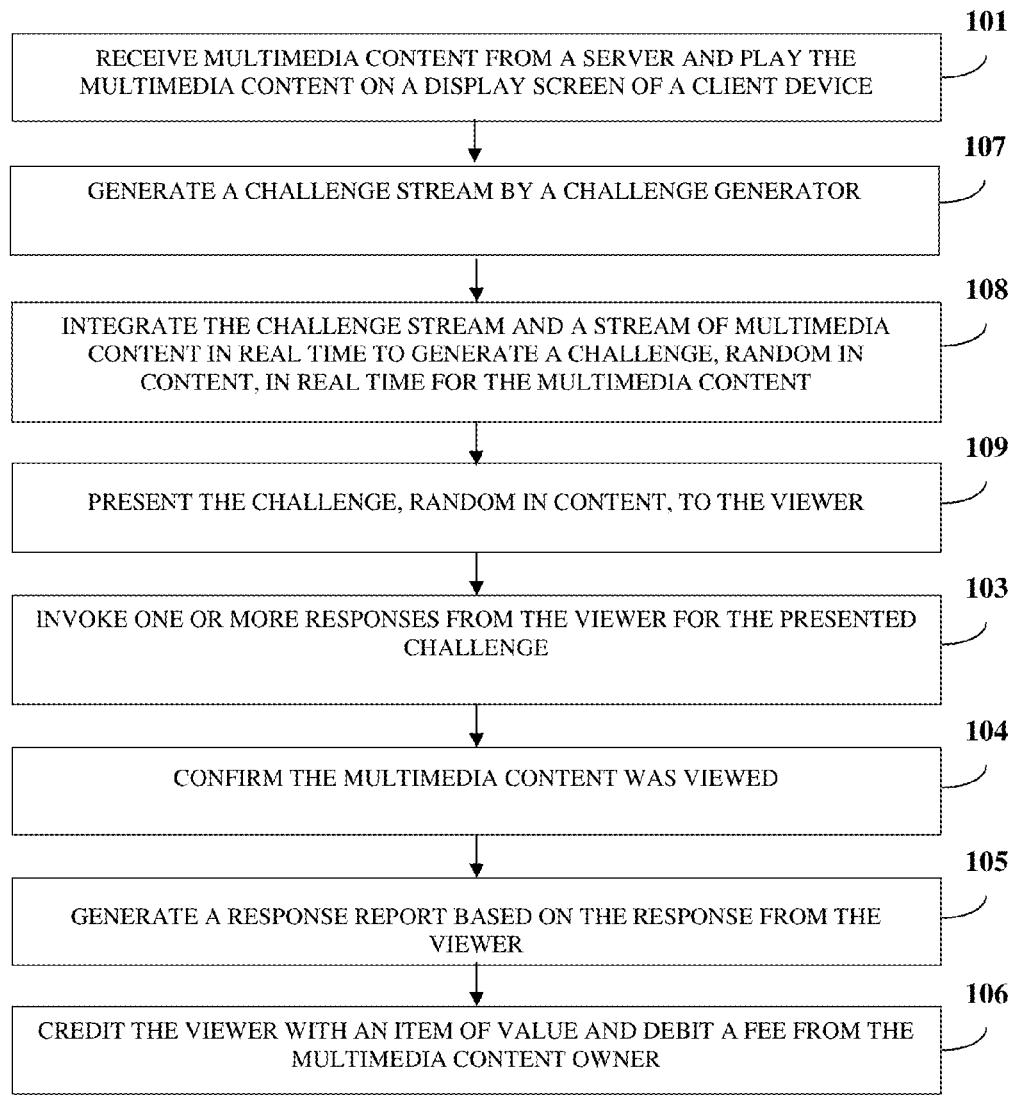
FIG. 1B illustrates a second embodiment of the computer implemented method for confirming that a viewer viewed multimedia content on a client device.

FIG. 1B illustrates a second embodiment of the computer implemented method for confirming that a viewer viewed multimedia content on a client device 301. A viewer's client device 301, exemplarily illustrated in FIG. 3, receives 101 multimedia content from the server 302 and plays the multimedia content on a display screen 301a of the client device 301, for example, in an audiovisual format. The view confirmation module 301b of the computer implemented system 300 disclosed herein comprises a challenge generator 301c, a challenge-response module 301d, and a report generation module 301e as exemplarily illustrated in FIG. 3. The challenge generator 301c generates 107 a challenge stream comprising multiple challenges. The content of each challenge in the challenge stream is random. The challenge stream and the stream of the multimedia content are integrated 108, that is, combined in real time to generate a challenge, random in content, in real time for each multimedia content play. In an embodiment, the challenge-response module 301d of the client device 301 can select one or more challenges from the challenge stream to display with the multimedia content stream on the client device 301. The generated challenge is random in content each time the same multimedia content is played on one or more client devices 301. The challenge, random in content, is generated from the combined stream and presented 109 to the viewer to confirm that the viewer viewed the multimedia content played on the display screen 301a of the client device 301.

In an embodiment, the challenge-response module 301d uses the challenge stream to generate challenges within one or more challenge sets. For example, the challenge sets comprise numbers, letters, symbols, shapes, etc. The elements within the challenge sets are, for example, numbers such as 0-9, letters such as a-z, symbols such as %, &, #, etc., and shapes such as a circle, a square, a triangle, etc. The client device 301 may limit the selection of a challenge set based on its input capability. For example, the challenge set may constitute only numbers for client devices 301 that are optimized only for numerical input. Other client devices 301 with enhanced input capabilities may have a combination of challenge sets within the challenge stream.

The challenge stream in the client device 301 is randomly generated by one of multiple methods that are known in the art using computational algorithms with a random seed that is solely determined by the client device 301. Examples of seeds comprise time of video stream commencement, exact random access memory available at the time of video stream commencement, etc.

Based on the challenge generator 301c, a stream of challenge elements is created from the available challenge sets. The challenge elements can be presented before, during and/or after play of the multimedia content, for example, a video and may comprise a single element or multiple elements. The timing of the challenges presented during the video is random. In an embodiment, the challenge generated by the client device 301 is different for each viewing of a video, regardless of the video content. In another embodiment, the challenge for the same video is different for each client device 301.

In an example, the challenge, random in content, is displayed as an overlay on the multimedia content. The challenges are integrated with the multimedia content by several techniques. For example, the challenge is integrated within an Adobe® Flash® or a shockwave flash (SWF) file and is presented as an overlay within the multimedia content. Another technique for integrating the challenge is to present the challenge, random in content, immediately outside the boundary of the multimedia player frame 1002, for example, above, below, to the left or to the right of the multimedia player frame 1002. The challenge is characterized, for example, by being one or more of unrelated to the multimedia content, presented at random times during and/or after play of the multimedia content, and presented at random physical locations on the multimedia content.

One or more responses are invoked 103 from the viewer for the presented challenge. A response may be invoked from the viewer during or at the end of play of the multimedia content. In an embodiment, if the viewer enters a response to the presented challenge, the response confirms 104 that the multimedia content has been viewed by the viewer. In another embodiment, if the viewer enters a correct response to the presented challenge in the client device 301, the response confirms 104 that the multimedia content was viewed by the viewer. A response report is generated 105 based on the response from the viewer, and transmitted to the server 302 for confirming that the multimedia content was viewed by the viewer. The viewer is credited 106 with an item of value, for example, cash, if the response report confirms the multimedia content was viewed by the viewer.

The response for a challenge, random in content, is invoked at any random point in time during or after the multimedia content is played. For example, the viewer is prompted to enter a response to the challenge, random in content, at the end of the duration of the multimedia content. The challenge, random in content, may appear once or multiple times when the multimedia content is played on the viewer's client device 301. The viewer may be prompted to respond to the challenge, random in content, either during or immediately following the completion of the multimedia content. In an example, the multimedia content is an audio-video file with a duration of 20 seconds. During the playing of the video, the numerals 7 and 9 are each flashed for 2 seconds, for example, at the $10^{th}$ and $15^{th}$ second respectively, after the start of the play of the video for the observation of the viewer. At the completion of the audio-video file, an answer box appears prompting the viewer to enter the numbers flashed during the audio-video, in order to register a correct response and therefore a confirmation of the view.

In another example, a video is played to the viewer, during which a pair of geometrical shapes, for example, a circle followed by a square appear in subsequent frames of the video. The geometrical shapes are overlaid at random positions on the video and appear independent of the video, or appear as part of the video. At the completion of the video, a pull down answer menu appears with several shape pairs as options. The viewer selects the correct shape pairs from the options in the menu to register a correct response. In another example, a video is played in the primary window of the user interface and a child window appears either cascaded with or alongside the parent window. The companion window displays a mathematical equation, such as (3+3=?), as the challenge. The video is paused momentarily, or for a response time-out period within which the viewer is required to enter the correct response, in this case 6. In an embodiment, the viewer is required to submit the correct response in order to resume playing of the video, or avoid termination of the video. In another example, a color is flashed in the foreground or the background when the video clip is being played. The viewer is required to either enter a description of the color or select the color from an options list to register a correct response.

In an embodiment, the challenge, random in content, comprises a target or a response region that appears on a touch-sensitive screen of, for example, an iPhone® of Apple Inc., or other touch-sensitive internet connected devices. The target or the response region appears on the touch-sensitive screen during the playing of a video. As used herein, the target or the response region is a viewer selectable area, randomly overlaid during the play of the multimedia content, with which the viewer interacts within a response time out period to register a valid response. The response is invoked in real time and involves the viewer, for example, touching a region on the touch-sensitive screen where the target or the response region appears. For example, a commercial on baseball is displayed on the touch-sensitive screen. During the play of the commercial, various baseball team logos are randomly displayed, each for 2 to 3 seconds. The viewer can confirm viewing of the commercial by touching the touch-sensitive screen when and where the logos appear. In an embodiment, the challenge and response interactions are implemented using GUI widgets. The challenge presented to the viewer is to pinpoint a position on the parent window where a child window, such as modal window, appears at a random position during the playing of the video in the parent window. A modal window is a child window that requires the viewer to interact with the child window before the viewer can return to the flow of the parent window. The challenge further comprises selecting the pinpointed position within a response time-out period. The selection of the pinpointed position is performed, for example, using a touch stylus on a touch-sensitive screen, or using a pointing device and a corresponding pointer on the display screen 301*a*. In this example, the user interface is a touch-sensitive screen or a pointing device in conjunction with a regular screen, respectively. The child window presenting the challenge may comprise a button that has to be selected by the viewer within the response time-out period to register a valid response.

In another example, the viewer is required to complete more than one challenge-response interaction, that is, locate and select more than one random target or response region at different time periods, during the play of a video. For example, during the playing of a video in the parent window, a first button appears for 5 seconds at half-way through the video, while a second button appears for 5 seconds at the end of the video. The viewer is required to locate and select both the buttons within the relevant response time-out periods to register a valid response. If the viewer has not correctly selected either of the targets or both the targets within the relevant response time-out periods, the viewer is prompted to replay the video and complete the challenge. In another example, the targets or the response regions, for example, one or more buttons appear immediately outside the boundary of the multimedia player frame 1002 as exemplarily illustrated in FIG. 10, during the play of a video. The viewer is required to locate and select the buttons within the relevant response time-out periods to register a valid response.

In an embodiment, one or more challenges, random in content, are presented at one or more times during and/or after the play of the multimedia content. In an embodiment, a response to each of the challenges, random in content, from the viewer is transferred to and presented on one or more random locations on the display screen 301*a* of the client device 301 or the multimedia player frame 1002 during the play of the multimedia content. Each response of the viewer is automatically registered on the display screen 301*a* of the client device 301 or the multimedia player frame 1002 at the end of play of the multimedia content. That is, the transferred responses are used for automatically registering responses to a challenge, random in content. For example, when a video of a long duration is played, a viewer can enter a response to a challenge, random in content, as soon as the challenge, random in content, travels across the display screen 301*a* or the multimedia player frame 1002. As soon as the responses to each of the challenges, random in content, are entered by the viewer, the responses are transferred, for example, to the sides of the viewer's display screen 301*a*, or at the boundary of the multimedia player frame 1002, where they reside until the end of the video. At the completion of the video, the viewer's responses are automatically populated, for example, in an answer box displayed on the viewer's display screen 301*a* or the multimedia player frame 1002, thereby automatically registering the response for confirmation of the view.

In an embodiment, the viewer is prompted to verify the automatically populated responses in the answer box prior to registering the responses. The responses to the challenges, random in content, from the viewer are transferred to and presented on one or more random locations on the display screen 301*a* or the multimedia player frame 1002 during the play of the multimedia content using various technologies. For example, Adobe® Flash® or shockwave flash (SWF) technology can accept individual responses while a video is playing and display the individual responses at random locations on the display screen 301*a* or the multimedia player frame 1002 for later transfer and registration as a complete response, for example, in an answer box displayed on the viewer's display screen 301*a* or the multimedia player frame 1002 at the end of play of the video.

Consider an example where a viewer watches a four-minute long advertisement. When a first random number, for example, 9 scrolls across the multimedia player frame 1002, the viewer immediately enters 9. A "9" then appears at the side of the multimedia player frame 1002. When a second random number, for example, 2 scrolls across the multimedia player frame 1002, the viewer immediately enters 2. A "2" joins the previously entered "9" at the side of the multimedia player frame 1002. At the end of the four-minute long video, an answer box with a text field automatically populated with "92" is displayed on the multimedia player frame 1002 for automatic submission. The viewer may also edit the numbers in the text field prior to submission.

In an embodiment, the challenge content is either visual or aural. In the latter case, the challenge content is in a non-visual alphanumeric form. If the challenge content is aural in nature, the challenge content is, for example, alphanumeric or indicative of a logo, icon, symbol, shape, picture, etc. If the challenge content is visual, the challenge content is, for example, in the form of a logo, icon, symbol, shape, picture, etc. The response for the challenge, random in content, requires the viewer to enter the challenge content, or to select the correct option from the presented options. The response is also manually or orally registered. For example, the viewer has to perform a manual action such as depressing a button, operating a pointing device or touching a screen, or utter words or sounds to register a response.

Consider an example where the challenge content is visually presented to the viewer. The challenge content, for example, a logo, an icon, a symbol, a shape, a picture, etc., is displayed for 5 seconds within a first child window during the play of an advertisement in a parent window or content rendering window. A second child window displays a message or a prompt such as "Provide the symbol above at the end of the advertisement", or "Select the symbol previously displayed". Consider another example where the challenge content is aurally presented to the viewer during the play of an advertisement. A speech synthesizer provides an audible sound indicative of the challenge content, and also prompts the viewer to remember and submit the challenge content at the end of the advertisement, for example, "Enter the two digits that you heard". The viewer submits the response by selecting the correct option indicative of the challenge content presented. The viewer also submits the response by depressing the appropriate alphanumeric keys of the input means of the client device 301. In another example, the viewer submits the response by uttering or orally articulating the challenge content, which is processed by suitable voice recognition software in the client device 301 or the server 302. In an embodiment, the viewer is required to submit the correct response within a time-out period.

In the event that the viewer enters an incorrect response, or enters the response after the elapse of the response time-out period, the challenge-response module 301d displays an error message or a prompt message, prompting the viewer to restart or replay the multimedia content. For example, the prompt message: "You have not entered the required digits in the time allocated, or you have entered the incorrect digits. Would you like to replay the advertisement?" is displayed, inviting the viewer to select either a "Yes" option, or a "No" option. If the viewer chooses to replay the multimedia content, the multimedia content is replayed and the procedure is repeated with a new challenge, random in content. The challenge generator 301c located in the client device 301 generates a new challenge, random in content, each time the same multimedia content is played on the client device 301. If the viewer chooses not to replay the multimedia content, the response report is generated indicating the incorrect response in the previous attempt, and the play of the multimedia content is terminated.

Figure 2:
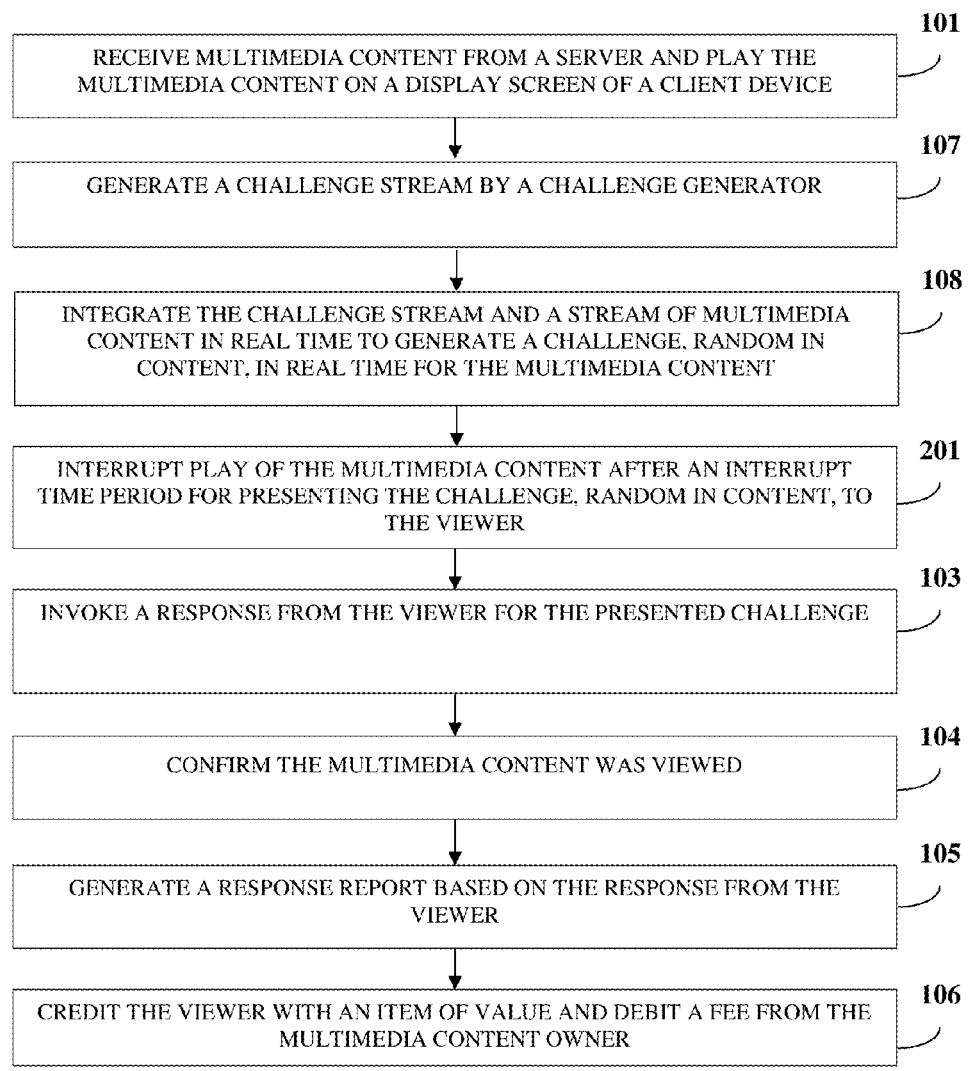
FIG. 2 illustrates a third embodiment of the computer implemented method for confirming that a viewer viewed multimedia content on a client device.

FIG. 2 illustrates a third embodiment of the computer implemented method for confirming that a viewer viewed multimedia content on a client device 301 exemplarily illustrated in FIG. 3. One or more multimedia content owners upload multimedia content on the server 302 of the media service provider. The client device 301 of a viewer receives 101 the multimedia content, for example, an advertisement, a commercial message, an educational clip, an entertainment clip, etc., from the server 302 and plays the multimedia content on a display screen 301a of the client device 301, for example, in an audiovisual format. The challenge generator 301c of the view confirmation module 301b exemplarily illustrated in FIG. 3, generates 107 a challenge stream comprising multiple challenges, wherein the content of each challenge in the challenge stream is random in content. The challenge stream and a stream of the multimedia content are integrated 108 in real time to generate a challenge, random in content, in real time for the multimedia content, where the challenge is random in content each time the same multimedia content is played on one or more client devices 301.

The play of the multimedia content is interrupted 201 after an interrupt time period for presenting the challenge, random in content generated by the challenge generator 301c in the client device 301 and displayed on the display screen 301a of the client device 301 to the viewer. The interrupt time period is less than the duration of the multimedia content. The challenge content is generated and displayed at random on the multimedia content. The challenge, random in content, is presented to the viewer, for example, by overlaying the challenge, random in content, on the multimedia content as disclosed in the detailed description of FIGS. 1A-1B. A response is invoked 103 from the viewer for the presented challenge, random in content. If the viewer enters the response to the presented challenge, random in content, the response confirms 104 that the multimedia content was viewed by the viewer. A response report is generated 105 based on the response from the viewer. The viewer is credited 106 with an item of value, if the response report confirms the multimedia content was viewed by the viewer, while the multimedia content owner is debited a fee.

In an embodiment, the client device 301 receives a list of multimedia content from the server 302 for selection by the viewer as disclosed in the detailed description of FIGS. 1A-1B. The multimedia content selected by the viewer is rendered on the client device 301 and the duration of the selected multimedia content is determined. The rendering of the multimedia content is interrupted after an interrupt time period for presenting a challenge, random in content. The interrupt time period is less than the duration of the rendered multimedia content. For example, an audio-video clip of duration M seconds is interrupted, L seconds after the audio-video clip commences, for presenting a challenge, random in content. The steps of rendering the viewer selected multimedia content, interrupting the multimedia clip for presenting a challenge, random in content, invoking a response, and generating a response report may be repeated for other multimedia content in the list depending on the selection of the viewer. In an embodiment, the interrupted multimedia content is not resumed until a correct response is submitted for the challenge, random in content, by the viewer.

In an embodiment, the interrupt time period is generated using a random generator 302g. A timer 301f is provided to begin counting the interrupt time period at the start of the play of the multimedia content. When the timer 301f reaches the interrupt time period, the play of the multimedia content is interrupted at a random time to present the challenge, random in content, to the viewer on the client device 301.

FIG. 3 illustrates a computer implemented system 300 for confirming that a viewer viewed multimedia content on a client device 301. The computer implemented system 300 comprises a server 302 and a client device 301. The client device 301 is in communication with the server 302 via a network 303. The client device 301 comprises a display screen 301a, an input means (not shown), a transceiver 305, and a timer 301f. The server 302 comprises an upload module 302f, a network interface 302e, a report receiving module 302a, a media database 302d, a media aggregator 302c, and a payment module 302b. The computer implemented system 300 disclosed herein further comprises a view confirmation module 301b provided on the client device 301 or the server 302. The server 302 provides multimedia content to a viewer.

The upload module 302f uploads multimedia content provided by one or more multimedia content owners on the server 302. The client device 301 connects to the server 302 via the network 303 for receiving the multimedia content from the server 302. The multimedia content is played on the display screen 301a of the client device 301. The view confirmation module 301b on the client device 301, or in an embodiment on the server 302 confirms that the viewer viewed the multimedia content on the client device 301. The view confirmation module 301b comprises a challenge generator 301c, a challenge-response module 301d, and a report generation module 301e. The challenge generator 301c in the client device 301 generates a challenge that is one or more of random in content, unrelated to the multimedia content, presented at random times during and/or after play of the multimedia content, and presented at random physical locations on the multimedia content on the display screen 301a of the client device 301. In an embodiment, the challenge generator 301c also generates a challenge, pseudorandom in content as disclosed in the detailed description of FIG. 1A.

The challenge-response module 301d presents the generated challenge, random in content, to the viewer on the display screen 301a of the client device 301 by overlaying the generated challenge, random in content, on the multimedia content. The challenge-response module 301d presents one or more challenges, random in content, at one or more times during and/or after play of the multimedia content. The challenge-response module 301d transfers a response to each challenge, random in content, from the viewer to one or more random locations on the display screen 301a of the client device 301 or on a multimedia player frame 1002, exemplarily illustrated in FIG. 10, within the display screen 301a of the client device 301 during the play of the multimedia content. The challenge-response module 301d automatically registers each transferred response of the viewer on the display screen 301a or the multimedia player frame 1002 at the end of play of the multimedia content as disclosed in the detailed description of FIG. 1B. The timer 301f counts an interrupt time period for interrupting the playing of the multimedia content and presenting the challenge, random in content, wherein the interrupt time period is less than the duration of the multimedia content.

In an embodiment, the challenge generator 301c generates a challenge stream comprising multiple challenges. Each challenge in the challenge stream is random in content. The challenge-response module 301d integrates the challenge stream and the stream of multimedia content in real time to generate a challenge, random in content, in real time for the multimedia content. The challenge is random in content each time the same multimedia content is played on the client device 301. The challenge-response module 301d presents the challenge, random in content to the viewer to confirm that the viewer viewed the multimedia content played on the display screen 301a of the client device 301, by displaying the challenge, random in content, as an overlay on the multimedia content.

The challenge-response module 301d invokes a response from the viewer for the presented challenge, random in content. The viewer enters the response to the presented challenge, random in content using the input means on the client device 301. The timer 301f ensures that the viewer provides the response to the challenge, random in content within the predetermined period of time after the challenge, random in content is presented. The challenge-response module 301d determines if the viewer enters a response for the presented challenge, random in content. The response confirms that the multimedia content was viewed by the viewer. In an embodiment, the challenge-response module 301d in the client device 301 determines if the response entered by the viewer to the presented challenge, random in content, is correct. In another embodiment, the response entered by the viewer is relayed to the view confirmation module 301b on the server 302 over the network 303, which determines whether the response provided is correct. A correct response confirms that the multimedia content was viewed by the viewer. The report generation module 301e generates a response report based on the response from the viewer and transmits the response report to the server 302.

The payment module 302b credits the viewer with an item of value and debits a fee from the multimedia content owner, if the response report confirms that the multimedia content was viewed by the viewer. In an embodiment, the payment module 302b credits the viewer with an item of value and debits a fee from the multimedia content owner for each correct response that the viewer provides to one or more of the presented challenges, random in content.

The server 302 transmits multimedia content to the viewer either on request or automatically. The media database 302d stores several multimedia content files in different formats, and is updated after every cycle of production of the multimedia content. The multimedia content stored in the media database 302d comprises audio, video, internet web pages, interactive games and applications, and other playable formats. The media aggregator 302c queries the media database 302d and prepares a list of multimedia content available for distribution over the network 303. The network interface 302e connects the server 302 to the network 303, for example, the internet, a wireless network, or a wired network.

The client device 301 comprises a transceiver 305 that connects the client device 301 to the server 302 via the network 303. In the case of a cellular client device 301, the transceiver 305 communicates with the server 302 via a cellular communication network 304. The input means of the client device 301 accepts a selection of the multimedia content from the viewer. The client device 301 is capable of downloading, storing, and rendering multimedia content of one or more formats obtained from the server 302. The multimedia content, incorporating the challenge-response mechanism, may also be transmitted through the network 303 and rendered on a web browser in an internet-enabled client device 301 or mobile phone as streaming multimedia content. The multimedia content may also be distributed to televisions via integrated receivers/decoders or set top boxes and viewed through interactive television. In an example, the multimedia content is made available in an interactive group setting or multi-viewer environment, such as a focus group, for viewing the multimedia content, discussing, testing, or any other purposes.

In an embodiment, the same multimedia content is broadcasted simultaneously to multiple client devices 301 over the network 303, for example, a television network or a cellular communication network 304 using a general packet radio service (GPRS), etc. Each of the client devices 301 receiving the broadcasted multimedia content autonomously integrates a challenge, random in content from the challenge stream generated locally by the challenge generator 301c in the client device 301 in real time, and renders the multimedia content along with the challenge overlay. Consider an example where multimedia content is broadcast to multiple client devices 301. In this example, even if the same multimedia content is displayed on two or more different client devices 301, different challenges, wherein each challenge is random in content, are presented on the client devices 301 along with multimedia content, because the challenges, random in content are generated locally by the challenge generator 301c in each of the client devices 301. Accordingly, each viewer receiving the broadcasted multimedia content experiences a challenge-response interaction different from the other viewers of the same multimedia content.

The challenge-response module 301d in the view confirmation module 301b presents a challenge, random in content, by briefly overlaying the challenge, random in content, on the multimedia content being played. The challenge-response module 301d invokes a response from the viewer for the challenge, random in content. In an embodiment, the server 302 comprises the view confirmation module 301b either in addition to or as a substitute for the challenge-response module 301d on the client device 301. The report receiving module 302a receives the response report transmitted by the client device 301. The payment module 302b in communication with the report receiving module 302a generates and maintains a monetary credit for the viewer based on the response report.

In an embodiment, the client device 301 downloads the multimedia content when the client device 301 is connected to the server 302. If eventually the viewer launches the view confirmation module 301b when the connection to the server 302 is inactive, the client device 301 renders the downloaded multimedia content in an off-line mode, performs a challenge-response interaction with the viewer, and generates and stores the response report. The off-line mode is triggered when the connection to the server 302 is inactive. When a connection to the server 302 is established, for example, via satellite, the network 303, etc., the response report is transmitted to the server 302 over the connection. In another embodiment, the client device 301 renders the multimedia content transmitted by the server 302 as streaming multimedia content. If the viewer launches the view confirmation module 301b when the connection to the server 302 is active, the client device 301 renders the multimedia content in an online mode. In an embodiment, the challenge-response interaction with the viewer is performed by the view confirmation module 301b on the server 302. The response report generated after completing the challenge-response interaction is transmitted to the server 302 over the active connection. The response report is also generated by the view confirmation module 301b on the server 302 in the online mode.

In an embodiment, the server 302 may periodically notify the viewer of the available multimedia content, for example, advertisements, including the amount payable to the viewer for viewing each advertisement. The server 302 also notifies the viewer of the available advertisements upon request of the viewer. For example, the server 302 periodically transmits short message service (SMS) messages to the client device 301, for example, a cellular phone of the viewer. In another example, the server 302 may notify the viewer by broadcasting unstructured supplementary service data (USSD) messages. Upon the request of the viewer, the server 302 may transmit an updated list of multimedia content to the client device 301 for selection and viewing by the viewer.

In an embodiment, the server 302 further comprises a registration facility whereby a potential viewer registers the client device 301 for the media service. During the registration process, the viewer is requested to submit the unique identifier of the client device 301, an identity of the viewer, and optionally a password or a personal identification number (PIN) for authentication, and a credit account number. After completing the registration process, a user identifier (ID) and suitable software module, such as, the view confirmation module 301b is supplied to the client device 301 of the viewer. The view confirmation module 301b is executed for programming the client device 301 of the viewer, whereby the client device 301 is rendered capable of establishing a client-server relationship with the server 302.

In an example, the viewer requests the server 302 to access the service through the client device 301. The server 302 verifies whether the viewer is authenticated to access the service by requesting the user identifier supplied during registration, and transmits multimedia content to the client device 301 for selection. If the server 302 fails to authenticate the viewer, the server 302 prompts the viewer to undergo the registration process. The viewer may choose to continue with the registration process or terminate the connection to the server 302. After the viewer is authenticated, the multimedia content is received by the client device 301. The client device 301 launches the view confirmation module 301b and the display screen 301a presents a menu with options for displaying the list of multimedia content including the monetary amount payable to the viewer for viewing each multimedia content item in the list. The viewer selects a desired multimedia content item using the menu, and the selected multimedia content item is played to the viewer. The challenge-response module 301d presents the challenge, random in content and invokes a response during or after the multimedia content is played.

The report generation module 301e generates a response report with report details based on the response received from the viewer. The client device 301 verifies whether the connection to the server 302 is active, and transmits the response report to the server 302. The report receiving module 302a receives the response report and instructs the payment module 302b to credit the viewer's account, for example, with a designated amount of money. If the connection to the server 302 is temporarily unavailable, the response report is temporarily stored in the client device 301, and transmitted when the connection is available again. The recently viewed multimedia content is deleted from the list, and the list of available multimedia content is updated and displayed again on the client device 301 for repeating the steps described above. Alternatively, the viewer may choose to terminate the view confirmation module 301b at this point by selecting an exit option from the menu.

Figure 4:
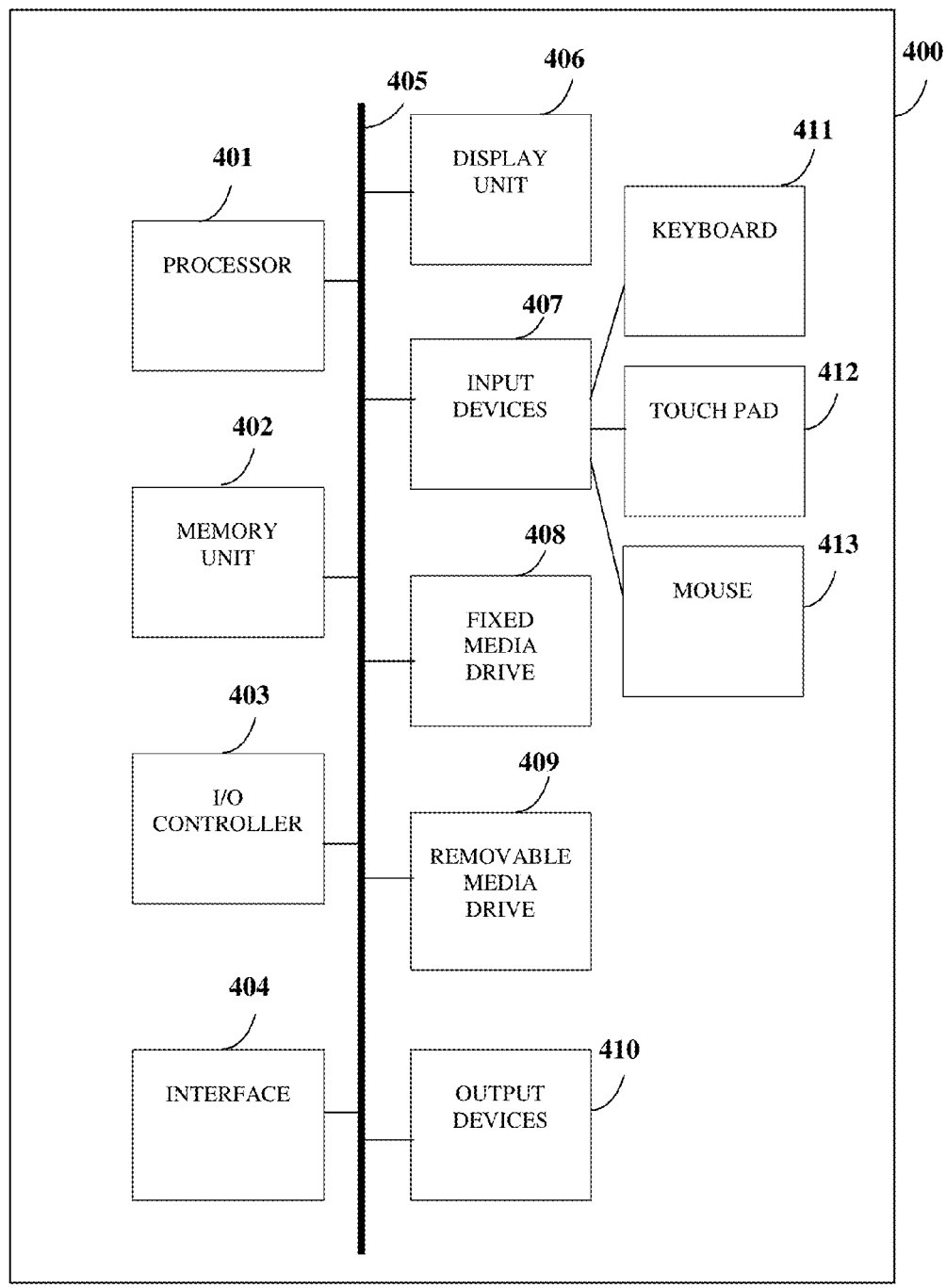
FIG. 4 exemplarily illustrates a computer system architecture employed on the client device and a server of a media service provider.
Figure 5A:
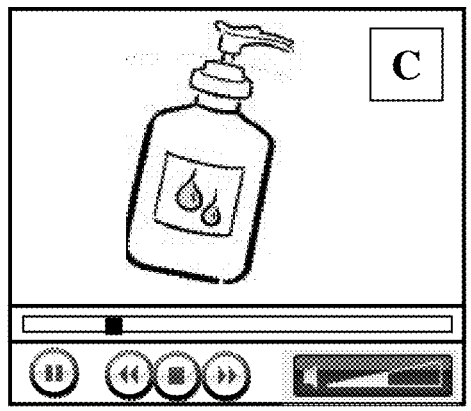
FIGS. 5A-5D exemplarily illustrate screen shots for a video advertisement campaign.
Figure 5B:
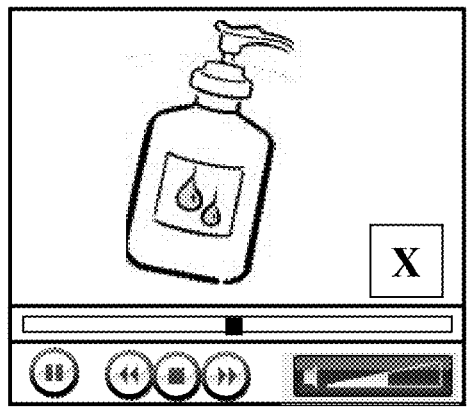
Figure 5C:
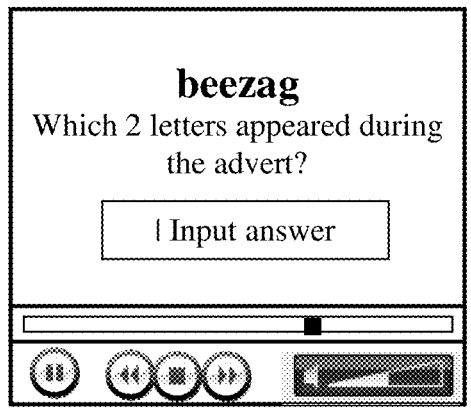
Figure 5D:
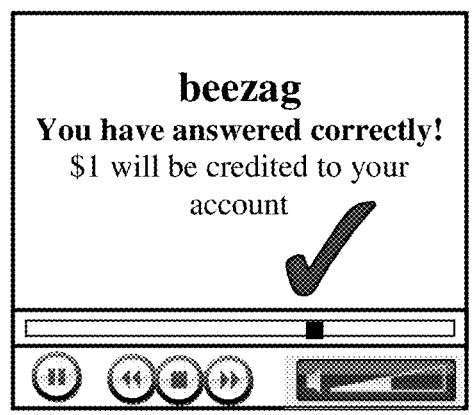
Figure 6A:
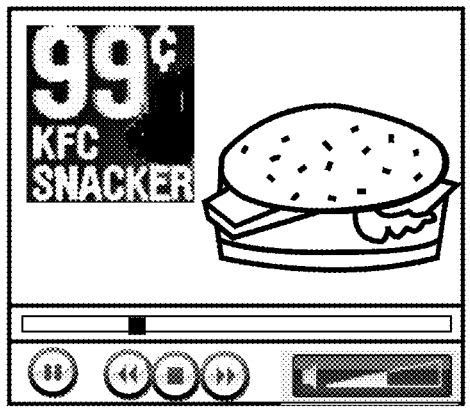
FIGS. 6A-6D exemplarily illustrate screen shots for a video advertisement campaign.
Figure 6B:
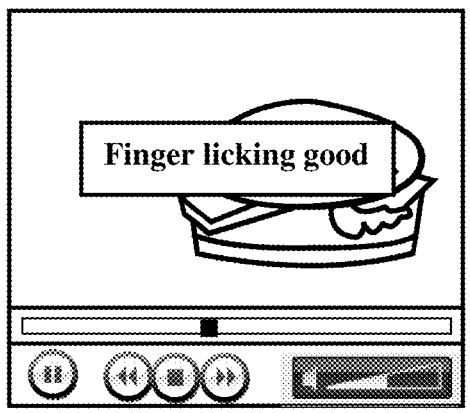
Figure 6C:
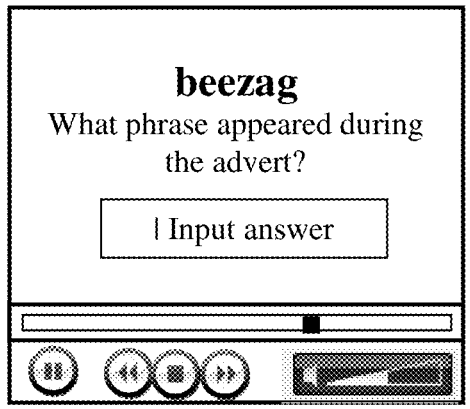
Figure 6D:
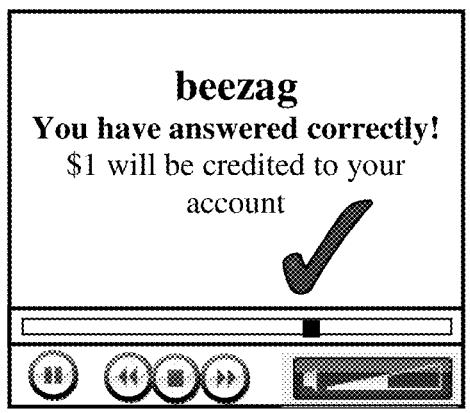
Figure 7A:
FIGS. 7A-7D exemplarily illustrate screen shots of a training video for managers.
Figure 7B:
Figure 7C:
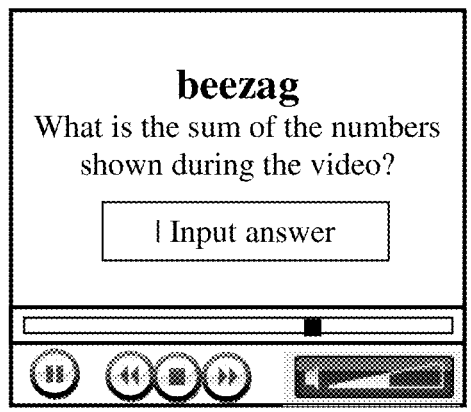
Figure 7D:
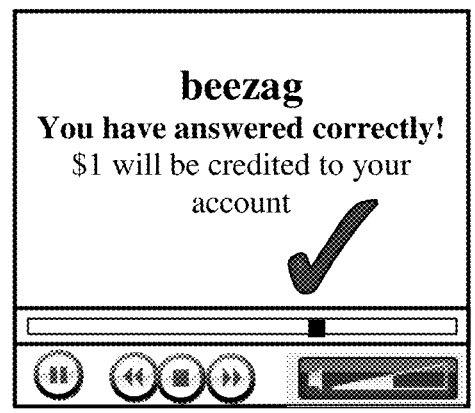
Figure 8A:
FIGS. 8A-8D exemplarily illustrate screen shots for an iPhone application and coupon offer.
Figure 8B:
Figure 8C:
Figure 8D:
Figure 9A:
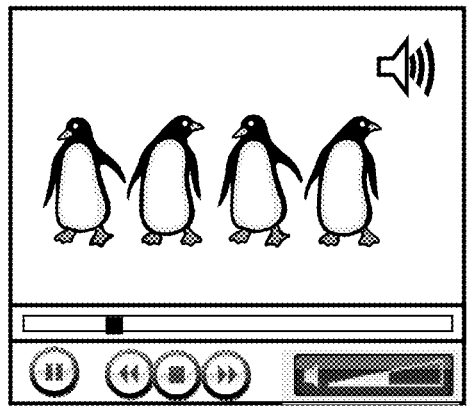
FIGS. 9A-9D exemplarily illustrate screen shots for a video advertisement campaign.
Figure 9B:
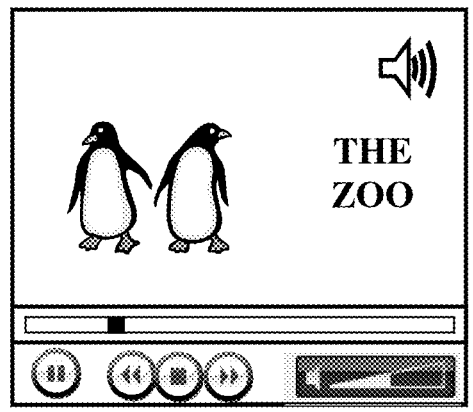
Figure 9C:
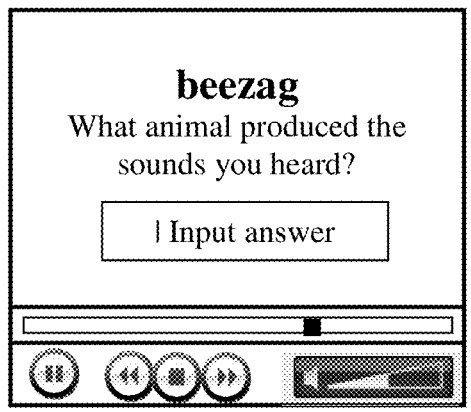
Figure 9D:
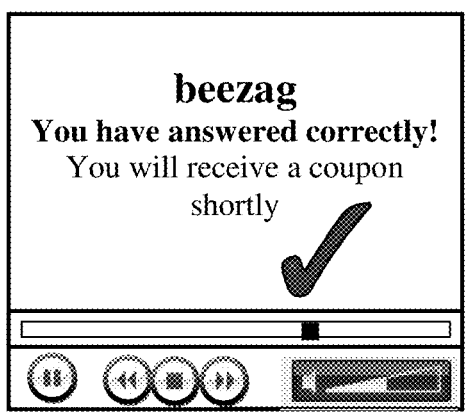

FIG. 4 exemplarily illustrates a computer system architecture employed on the client device 301 and the server 302 of the media service provider. The client device 301 and the server 302 of the computer implemented system 300 exemplarily illustrated in FIG. 3 employ the architecture of the computer system 400 exemplarily illustrated in FIG. 4. The client device 301 communicates with the server 302 via a network 303, for example, a short range network or a long range network. The network 303 is, for example, a local area network (LAN), a wide area network, a mobile communication network, etc. The computer system 400 executes the view confirmation module 301b. The computer system 400 comprises a processor 401, a memory unit 402 for storing programs and data, an input/output (I/O) controller 403, an interface 404, a data bus 405, a display unit 406, input devices 407, a fixed media drive 408, a removable media drive 409 for receiving removable media, and output devices 410.

The processor 401 is an electronic circuit that can execute computer programs. The memory unit 402 is used for storing programs, applications, and data. For example, the modules 301c, 301d, and 301e of the view confirmation module 301b are stored on the memory unit 402 of each respective computer system 400. The memory unit 402 is, for example, a random access memory (RAM) or another type of dynamic storage device that stores information and instructions for execution by the processor 401. The memory unit 402 also stores temporary variables and other intermediate information used during execution of the instructions by the processor 401. The computer system 400 further comprises a read only memory (ROM) or another type of static storage device that stores static information and instructions for the processor 401. The interface 404 enables connection of the computer system 400 of the client device 301 and the server 302 to the network 303. The computer system 400 communicates with other computer systems through the interface 404. The interface 404 is, for example, an infrared (IR) interface, a WiFi interface, a universal serial bus interface (USB), a local area network (LAN) interface, a wide area network (WAN) interface, etc.

The I/O controller 403 controls the input and output actions performed by the viewer using the client device 301. The data bus 405 permits communications between the modules 301c, 301d, and 301e of the view confirmation module 301b and the modules 302a, 302b, 302c, 302f, 302g, etc., of the server 302, and further, internally between the modules 302a, 301b, 302b, 302c, 302f, 302g, etc., of the server 302. The display unit 406 displays, via the display screen 301a, the multimedia content, the challenges random in content, etc., and other results computed by the client device 301 and the server 302 to the viewer. The input devices 407 are used for inputting data into the computer system 400. The input devices 407 comprise, for example, a keyboard 411 such as an alphanumeric keyboard, a touch pad 412, a computer mouse 413, a joystick, a light pen, a touch-sensitive screen, etc. The output devices 410 output the results of the operations performed by the client device 301 and the server 302.

Computer applications or programs are used for operating the computer system 400. The programs are loaded onto the fixed media drive 408 and into the memory unit 402 of the computer system 400 via the removable media drive 409. In an embodiment, the computer applications and programs may be loaded directly via the network 303. Computer applications and programs are executed by double clicking a related icon or menu displayed on the display unit 406 using one of the input devices 407. Further the computer system 400 employs an operating system for performing multiple tasks. The operating system manages execution of the view confirmation module 301b of the client device 301 and the server 302, and other modules, for example, 302a, 302b, 302c, 302f, 302g, etc., of the server 302. The operating system further manages security of the computer system 400, peripheral devices connected to the computer system 400, and network connections. The operating system recognizes keyboard inputs and pointing device inputs of a viewer, output display, files and directories stored locally on the fixed media drive 408. The operating system on the computer system 400 executes different programs using the processor 401. The operating system monitors the use of the processor 401. The processor 401 retrieves the instructions for executing the modules, for example, 301c, 301d, and 301e of the view confirmation module 301b from the program memory. The processor 401 also retrieves the instructions for executing the modules, for example, 302a, 302b, 302c, 302f, 302g, etc., of the server 302 from the program memory. A program counter determines the location of the instructions in the program memory. The program counter stores a number that identifies the current position in the program of the modules, for example, 301c, 301d, and 301e of the view confirmation module 301b and the modules, for example, 302a, 302b, 302c, 302f, 302g, etc., of the server 302.

The instructions fetched by the processor 401 from the program memory after being processed are decoded. The instructions are placed in an instruction register in the processor 401. After processing and decoding, the processor 401 executes the instructions. For example, the challenge generator 301c defines instructions for generating a challenge stream comprising multiple challenges, where the content of each of the challenges in the challenge stream is random. The challenge-response module 301d defines instructions for integrating the challenge stream and a stream of the multimedia content in real time to generate a challenge, random in content, in real time for the multimedia content, where the challenge is random in content each time the same multimedia content is played on the client device 301.

The challenge-response module 301d also defines instructions for presenting the challenge, random in content, to the viewer to confirm that the viewer viewed the multimedia content played on the display screen 301a of the client device 301, by displaying the challenge, random in content, as an overlay on the multimedia content. The challenge-response module 301d also defines instructions for invoking a response from the viewer for the presented challenge, and for determining if the response is entered by the viewer for the presented challenge to confirm the multimedia content was viewed by the viewer. The report generation module 301e defines instructions for generating a response report based on the response from the viewer. In an embodiment, the report receiving module 302a of the server 302 defines instructions for receiving the response report from the client device 301 via the network 303.

The challenge-response module 301d also defines instructions for presenting one or more challenges, random in content, at one or more times during and/or after play of the multimedia content. The challenge-response module 301d also defines instructions for transferring a response to each of one or more challenges, random in content, from the viewer to one or more random locations on the display screen 301a of the client device 301 or on a multimedia player frame 1002 exemplarily illustrated in FIG. 10, during the play of the multimedia content, and for automatically registering each response of the viewer on the display screen 301a or the multimedia player frame 1002 at the end of play of the multimedia content. The payment module 302b of the server 302 defines instructions for crediting the viewer with an item of value and debiting a fee from the multimedia content owner, if the response report confirms the multimedia content was viewed by the viewer.

The instructions from the modules, for example, 301c, 301d, and 301e of the view confirmation module 301b are stored in the memory unit 402. The instructions from the report receiving module 302a and the payment module 302b are also stored in the memory unit 402 of the computer system 400 of the server 302. The multimedia content is transferred from the media database 302d to the view confirmation module 301b through the interface 404 and via the network 303. A viewer initiates the execution of the view confirmation module 301b by double clicking on the icon for the view confirmation module 301b on the display unit 406 or the execution of the view confirmation module 301b is automatically initiated on transmitting multimedia content to the view confirmation module 301b.

The processor 401 employed by the client device 301 and the server 302 retrieves instructions for executing the view confirmation module 301b from the modules, for example, the challenge generator 301c, the challenge-response module 301d, and the report generation module 301e in the view confirmation module 301b. The processor 401 of the server 302 retrieves the instructions defined by the report receiving module 302a and the payment module 302b and executes the instructions. At the time of execution, the instructions stored in the instruction register are examined to determine the operations to be performed. The processor 401 then performs the specified operations. The operations include arithmetic and logic operations. The operating system performs multiple routines for performing a number of tasks required to assign input devices 407, the output devices 410, and memory for execution of the view confirmation module 301b and the other modules, for example, 302a, 302b, 302c, 302f, 302g, etc., of the server 302.

The tasks performed by the operating system comprise assigning memory to the view confirmation module 301b, the report receiving module 302a, the payment module 302b, etc., and data, moving data between the memory unit 402 and disk units and handling input and/or output operations. The operating system performs the tasks on request by the operations and after performing the tasks, the operating system transfers the execution control back to the processor 401. The processor 401 continues the execution to obtain one or more outputs. The outputs of the execution of the view confirmation module 301b, the report receiving module 302a, and the payment module 302b are displayed to the viewer on the display unit 406.

Disclosed herein also is a computer program product comprising computer executable instructions embodied in a non-transitory computer readable storage medium. As used herein, the term "non-transitory computer readable storage medium" refers to all computer readable media, for example, non-volatile media such as optical disks or magnetic disks, volatile media such as a register memory, processor cache, etc., and transmission media such as wires that constitute a system bus coupled to the processor 401, except for a transitory, propagating signal.

The computer program product disclosed herein comprises one or more computer program codes for confirming that a viewer viewed multimedia content on the client device 301. For example, the computer program product disclosed herein comprises a first computer program code for receiving multimedia content from the server 302 and playing the multimedia content on the display screen 301a of the client device 301, a second computer program code for generating a challenge stream comprising multiple challenges, wherein each challenge in the challenge stream is random in content, a third computer program code for integrating the challenge stream and the stream of multimedia content, in real time, to generate a challenge, random in content, in real time for the multimedia content, a fourth computer program code for presenting the challenge, random in content, to the viewer to confirm that the viewer viewed the multimedia content played on the display screen 301a of the client device 301, a fifth computer program code for invoking a response from the viewer for the presented challenge, a sixth computer program code for confirming that the multimedia content was viewed by the viewer if a response is entered by the viewer in the client device 301 for the presented challenge, a seventh computer program code for generating a response report based on the response from the viewer, and an eighth computer program code for crediting the viewer with an item of value, if the response report confirms the multimedia content was viewed by the viewer. The computer program product disclosed herein further comprises additional computer program codes for performing additional steps that may be required and contemplated for confirming that a viewer viewed multimedia content on the client device 301.

The computer program codes comprising the computer executable instructions for confirming that a viewer viewed multimedia content on the client device 301 are embodied on the non-transitory computer readable storage medium. The processor 401 of the computer system 400 retrieves these computer executable instructions and executes them. When the computer executable instructions are executed by the processor 401, the computer executable instructions cause the processor 401 to perform the method steps for confirming that a viewer viewed multimedia content on the client device 301. In an embodiment, a single piece of computer program code comprising computer executable instructions performs one or more steps of the computer implemented method disclosed herein for confirming that a viewer viewed multimedia content on the client device 301.

For purposes of illustration, the detailed description refers to the view confirmation module 301b being run locally on a computer system 400; however the scope of the computer implemented method and system 300 disclosed herein is not limited to the view confirmation module 301b being run locally on the computer system 400 via the operating system and the processor 401, but may be extended to run remotely over the network 303, for example, by employing a web browser and a remote server, a mobile phone, or other electronic devices.

For the purposes of illustration, the detailed description refers to a single client device 301; however the scope of the computer implemented method and system 300 disclosed herein is not limited to a single client device 301 but may be extended to include multiple client devices 301 and multiple levels of client devices 301.

An exemplary server setup as illustrated in FIG. 3 comprises a media database 302d for storing multimedia content of commercial, educational, and entertaining in nature. For example, multimedia content such as advertisement media clips are obtained in suitable formats from advertisement agencies or media representatives of product and service companies, and uploaded to the media database 302d. In another example, the advertisement agencies or the media representatives undertaking extensive campaigning may add new advertisement media clips, and update or modify existing advertisement media clips by accessing the media database 302d. The media aggregator 302c recognizes changes made to the contents of the media database 302d, including metadata changes, for example, changes in the duration of the advertisement media clips, the names of the advertisement media clips, etc., and prepares and updates the list of multimedia content.

The server 302 may allow controlled access to the server 302 and the resources therein, such as the media database 302d, through a web front-end. An example of such a web front-end is a website, for example, http://www.beezag.com. The advertisement agencies or the media representatives are required to setup an account for themselves by registering as an approved advertiser through the web front-end before submitting their advertisement clips. The approval workflow for registering advertiser accounts and uploading advertisement clips may be assigned to process owners or administrators on a regional basis. Furthermore, the approval workflow may comprise different stages of approval such as account-level approval, financial approval, and publishing approval. After the advertiser registers an account, the advertiser may upload advertisement clips and other multimedia content into the media database 302d for distribution to targeted viewers. The advertiser may be charged designated amounts for each confirmed view and non-confirmed view response report received by the server 302.

The advertisement multimedia clips comprise, for example, audio clips, video clips, animations, still images, text attachments, or suitable combinations of these. The advertisement clips also comprise, for example, promotional segments such as universal resource locators (URLs) directing viewers to the web front-end or other proprietary websites of the product and service companies. The promotional segments also comprise, for example, digital coupons or vouchers redeemable for special discounts on advertised products and services, questionnaire for sharing additional information, etc. The coupons and vouchers may also be distributed to targeted viewers via SMS messages.

In an embodiment, the viewer is prompted to share the viewed multimedia content, such as advertisement clips through the view confirmation module 301b on the client device 301 or the server 302. The viewers may share the advertisement clips by syndicating or micro-blogging the advertisement clips on social networking websites, for example, Twitter, Facebook, Myspace, etc., or by forwarding the advertising clips through electronic mail (email) services and SMS.

Enumerated herein are examples of the computer implemented method and system 300 disclosed herein, categorized by the challenge content and the invoked response. In an example, the challenge content and the invoked response comprise visual and mentally-solvable challenge-responses. For example, Pfizer Inc. creates a video advertisement for Purell® hand sanitizer targeted for mothers of children between the ages of 5 to 21. A video advertisement campaign is created and uploaded into the media database 302d using the upload module 302f, via the web front-end of the media service provider, for delivery to the target demographic membership selected in the web front-end. FIGS. 5A-5D exemplarily illustrate screen shots for a video advertisement campaign for the hand sanitizer. An alphanumeric-based challenge comprising random letters is presented to the viewer during the play of the video advertisement. A first letter "C" occurs at 10 seconds into the video advertisement and is placed in the top right corner of the display screen 301a as exemplarily illustrated in FIG. 5A. A second letter "X" occurs 5 seconds before the end of the video advertisement and is placed in the bottom right corner of the display screen 301a as exemplarily illustrated in FIG. 5B. When the video advertisement ends, the viewer is presented with a question, for example, "Which two letters appeared during the advert?" as exemplarily illustrated in FIG. 5C. If the viewer answers the question correctly as determined by the challenge-response module 301d of the view confirmation module 301b, viewing of the video advertisement by the viewer is confirmed. The view confirmation module 301b sends a message, for example, "You have answered correctly!" as exemplarily illustrated in FIG. 5D and credits an item of value, for example, $1, to the viewer's account. The view confirmation module 301b enables control of challenge variables, for example, the number of alphanumeric characters presented during the advertisement play, the timing of the appearance and disappearance of the alphanumeric characters, a threshold accuracy of the viewer's response to the challenge to register a positive response, the time-out period for the response, etc.

In another example, Kentucky Fried Chicken (KFC®) Corporation creates a video advertisement for their new chicken snacker targeted for men and women between the ages 18 to 55 in northeast United States. A video advertisement campaign is created and uploaded into the web front-end for delivery to the target demographics. FIGS. 6A-6D exemplarily illustrate screen shots for a video advertisement campaign for KFC's chicken snacker. A keywords and phrases based challenge comprising a random word or phrase is presented to the viewer during the play of the video advertisement. During the play of the video advertisement as exemplarily illustrated in FIG. 6A, the phrase "Finger Licking Good!" is presented in a child window as exemplarily illustrated in FIG. 6B. When the video advertisement ends, the viewer is presented with a question about the words or phrases presented during the video advertisement as exemplarily illustrated in FIG. 6C. If the viewer answers the question correctly, the viewer confirms viewing of the video advertisement as exemplarily illustrated in FIG. 6D. Amongst the challenge variables, a variable in this example is the description of the keywords and phrases in a predefined set for random selection. The phrases in the predefined set comprise, for example, "Think KFC", "Finger Licking Good", "We do chicken right", "There's Fast Food, Then There's KFC", etc.

In another example, a human resource consultancy creates a sexual harassment training video for managers of employees in the state of California. The video is delivered online in discreet video chapters. FIGS. 7A-7D exemplarily illustrate screen shots of a training video for managers. A mathematical equation based challenge is selected by the consultancy, comprising a random equation, for example, 3+4=?, or random numbers such as "6" and "2" as exemplarily illustrated in FIGS. 7A-7B. This mathematical equation based challenge is presented to the viewer during the video chapter. When the video chapter ends, the viewer is presented with an opportunity to submit a solution to the mathematical equation, such as, "What is the sum of the numbers shown during the video?" as exemplarily illustrated in FIG. 7C. If the viewer answers the question correctly, the viewer confirms viewing of the video chapter as exemplarily illustrated in FIG. 7D. Amongst the challenge variables, a variable in this example is the degree of difficulty of the random equations depending on the operators in the equation.

In another exemplary category, the challenge content and the invoked response comprise visual and motor based challenge-responses. Johnson & Son, Inc. creates an iPhone application and coupon offer for Off!® Insect Repellants targeted for iPhone users herein referred to as "viewers". FIGS. 8A-8D exemplarily illustrate the screen shots for an iPhone application and coupon offer. The iPhone application randomly overlays and removes images of mosquitoes and other bugs as exemplarily illustrated in FIG. 8B-8C during the play of a video and requests the viewer to, for example, "Squash all the insects while viewing the advertisement" as exemplarily illustrated in FIG. 8A. For providing a response to the challenge in real time, the viewer touches the iPhone screen for simulating squashing of the random bugs that appear during the video. When the video ends, the viewer is presented with a score reflecting the viewer's performance. If the score is sufficient, the viewer is presented with a digital coupon as exemplarily illustrated in FIG. 8D. If the score is insufficient, the viewer has the opportunity to replay. The challenge variables, such as, the number of bug images presented during the video play, the timing of the appearance and disappearance of the bug images, a threshold score for earning a coupon, etc., is implemented in the iPhone application.

In another example, Johnson & Son, Inc. creates a web-based gaming application and coupon offer for "Off! Insect Repellants" targeted for males and females of ages 18 to 55 and above in the southeast, United States. The web-based gaming application randomly overlays and removes images of mosquitoes and other bugs during the play of a video. In responding to the challenge in real time, the viewer right-clicks over as many bug images as possible on a computer monitor screen, for simulating squashing of the random bugs, before the video ends. When the video ends, the viewer is presented with a score reflecting the viewer's performance. If the score is sufficient, the viewer is presented with a digital coupon to print or forward to a mobile client device 301. If the score is insufficient, the viewer has the opportunity to replay.

In another example, the challenge content and the invoked response comprise audio based challenge-responses. For example, the San Diego zoo creates a video advertisement for the summer season targeting mothers in southern California. A video advertisement campaign is created and uploaded into the web front-end for delivery to the target demographics. FIGS. 9A-9D exemplarily illustrate the screen shots for a video advertisement campaign. A hear and type challenge is presented to the viewer with a question about the audio elements randomly inserted and overlaid onto the audio content of the video advertisement as exemplarily illustrated in FIGS. 9A-9B. The random audio elements comprise, for example, animal sounds, bird sounds, etc. The question is, for example, "What animal produced the sounds you heard?" as exemplarily illustrated in FIG. 9C. If the viewer answers the question correctly, the viewer confirms viewing of the video advertisement as exemplarily illustrated in FIG. 9D. Among the challenge variables, a variable in this example is the type of audio elements in the predefined set for random selection and overlaying.

In another example, the San Diego zoo creates a mobile phone based marketing campaign for the summer season targeted at mothers in southern California. The marketing campaign involves a chance to win a 10% discount on adult entry ticket prices. The mobile phone based marketing campaign is created for delivery to the target demographics, and a hear and speak challenge-response is selected by the advertiser. A mobile phone user is notified of the marketing campaign through print advertisements or USSD broadcast messages directing the mobile phone user to call a phone number, listen to the summer events at the zoo, and win a 10% discount on the entry ticket price. When the mobile phone user calls, the mobile phone user is greeted with a recorded voice that lists the upcoming zoo events and attractions. The recorded voice is randomly interrupted, for example, by the sounds of animals and birds, etc. At the end of the call, the recorded voice presents the mobile phone user with a question about the audio elements randomly inserted and overlaid onto the recorded voice. The mobile phone user is then prompted to answer with a voice prompt, for example, "Speak your answer at the tone". The speech recognition software in the mobile phone or the server 302 processes the speech utterance representing the answer from the mobile phone user. If the mobile phone user answers the question correctly, the mobile phone user confirms that the mobile phone user has listened to the voice recording, and obtains a coupon by SMS. Amongst the challenge variables, a variable in this example is the accuracy in recognizing the speech utterance that qualifies the mobile phone user to type in the answer using a keypad for a positive response.

FIG. 10 exemplarily illustrates a screen shot for a scrolling challenge, random in content, for example, the numeral "5" 1001 moving in a leftward direction below the multimedia content. The challenge, random in content, appears randomly on or immediately outside a boundary of a multimedia player frame 1002 within the display screen 301a of the client device 301 exemplarily illustrated in FIG. 3, as disclosed in the detailed description of FIGS. 1A-1B.

Figure 11:
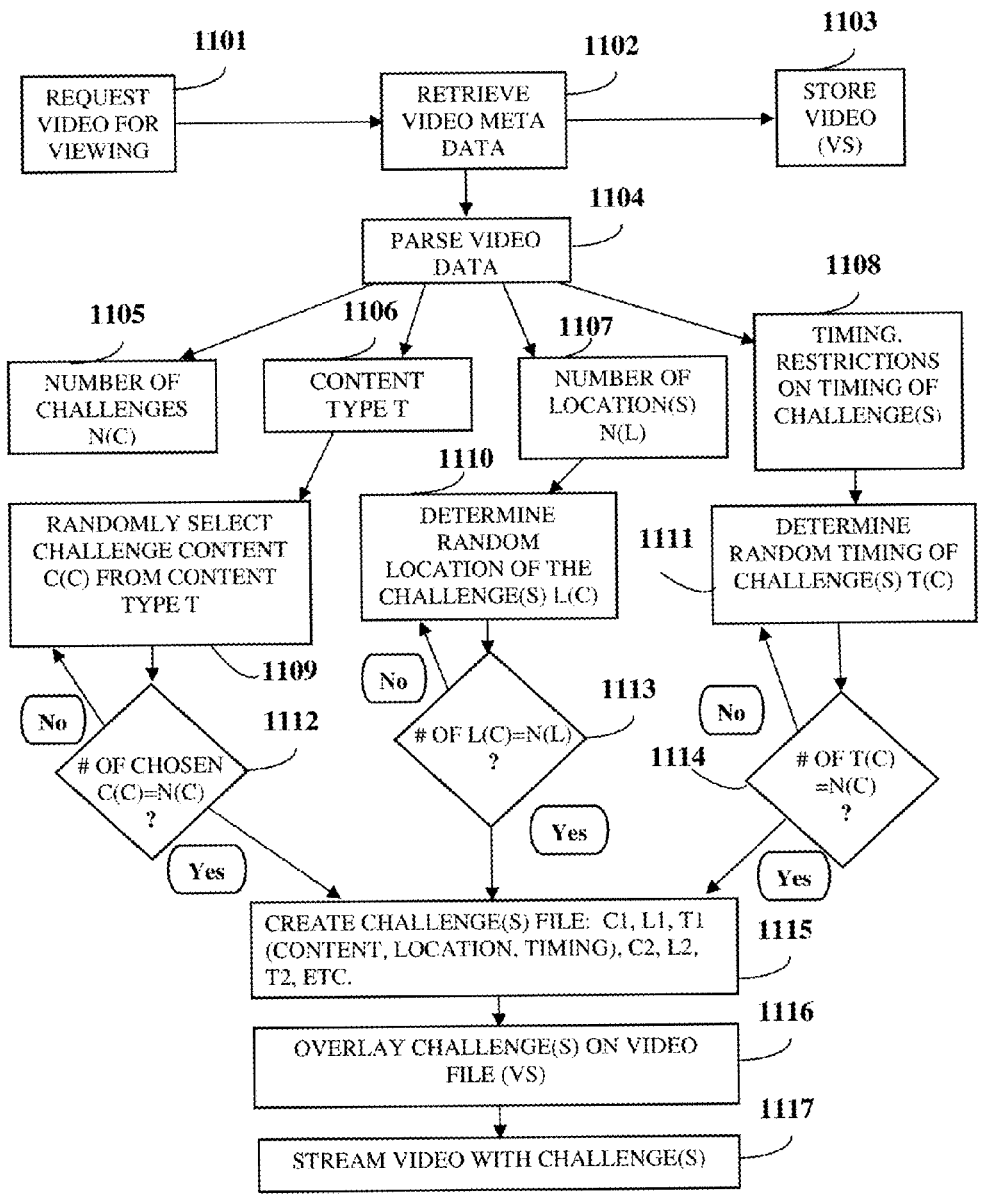
FIG. 11 exemplarily illustrates a flow diagram for generating and presenting challenges, random in content, on multimedia content.

FIG. 11 exemplarily illustrates a flow diagram for generating and presenting challenges, random in content on multimedia content. The viewer requests 1101 a video for viewing from the server 302 exemplarily illustrated in FIG. 3. The client device 301 receives the requested video and also retrieves 1102 the meta data associated with the video. The video is stored 1103 in the client device 301. The meta data of the video is parsed 1104 to determine, for example, the duration of the video. The challenge parameters, for example, the number of challenges 1105, the type of content 1106, the number of locations 1107 within predefined limits, the timing 1108 of the challenges including restrictions on the timing of the challenges are invoked based on the meta data of the video. One or more of the challenges, random in content is randomly selected 1109 from the available content types. The random locations and timing of the challenges are also determined 1110 and 1111. The selected content is verified to determine whether the challenge content is within the limits of the invoked parameters, such as the number of challenges 1112, number of locations 1113, timing restrictions 1114, etc. The challenge files are created 1115 with the selected challenge content, locations, and timing. The challenge content in the challenge files created are overlaid 1116 on the stored video. The video with the incorporated challenge content is streamed 1117 or played to the viewer.

FIGS. 12A-12G exemplarily illustrate a C++ implementation of the challenge generator 301c using Microsoft® Visual Studio® of Microsoft Inc. In the C++ code listing including the header files of FIGS. 12A-12G, two test cases are established for the challenge generator 301c exemplarily illustrated in FIG. 3. The two test cases are defined in the C++ code listing of FIG. 12A. The first test case generates a sequence of challenges for a 30 second video until the end of the video. The second test case generates a challenge within every 10 second segment of a video clip. The implementation exemplarily comprises two classes, namely, "Class bzChallenge-Generator" and "Class bzChallenge". The code for implementing the "Class bzChallengeGenerator" is exemplarily illustrated in FIGS. 12B-12C. The code for implementing the "Class bzChallenge" is exemplarily illustrated in FIG. 12F. FIGS. 12D-12E and FIG. 12G illustrate example header file definitions of "bzChallengeGenerator.h" and "bzChallenge.h". "Class bzChallengeGenerator" is used to specify the necessary parameters and generate a challenge within an optional sub-segment of the video. The static members of "Class bzChallengeGenerator" comprise the following:

"static const char* s_content[ ]" is an array of arrays of character instances comprising numbers, letters, or symbols. This implementation assumes that the challenge content data type is, for example, a single byte character, however the content's data type has alternate definitions in other implementations.

"static const unsigned int s_contentDuration" is the duration of the display of the content. For example, this value is kept constant at 3 seconds in this implementation, but may vary in other implementations.

Class bzChallengeGenerator also defines an enumerated data type as follows:

"enum ContentTypeEnum {NUMBERS=0, LETTERS=1, SYMBOLS=2}" identifies the character set to be used.

Class bzChallengeGenerator also defines the following data members:

"ContentTypeEnum m_contentType" defines the type of characters to be displayed in the video as a challenge.

"unsigned int m_contentDisplaySize" defines the size of the content's display area (square), in pixels, within a video display frame.

"unsigned int m_videoDisplayWidth" is the width of the video display frame, in pixels.

"unsigned int m_videoDisplayHeight" is the height of the video display frame, in pixels.

"unsigned int m_videoDuration" is the total play time of the video.

The following methods are defined in the Class bzChallengeGenerator:

"static int RangedRand(int from, int to)"—this class method returns a random integer in the closed interval [from, to].

"bzChallenge Generate(int begin=-1, int end=-1) const"—this method generates a challenge, random in content, with the specified properties. The caller optionally specifies the end points of a segment within the entire video in order to satisfy timing constraints of the application, for example, to ensure that a challenge is displayed in the last 20% or 10 seconds of the video's play time. An object of type bzChallenge is returned with the necessary attributes.

Class bzChallenge represents a result of the challenge generator 301c in the form of a challenge object. Class bzChallenge defines the following data members:

"char m_content"—selection of challenge content to display.

"unsigned int m_contentDisplaySize"—content display area in pixels (square).

"unsigned int m_offset"—offset in seconds from the beginning and the end of the video when the challenge content is displayed.

"unsigned int m_duration"—the duration of the display of challenge content.

"unsigned int m_xPosition"—the pixel position along the width of the display area where the challenge content is displayed.

"unsigned int m_yPosition"—the pixel position along the height of the display area where the challenge content is displayed.

This implementation randomly selects a position for the challenge content's display area within the specified dimensions of the video display frame. Alternatively, the implementation uses an external location map that defines discrete placements of the challenge content on the video display frame. In the alternative case, the challenge generator 301c randomly selects an index into the location map. FIG. 13 exemplarily illustrates sample output after executing the two test cases established for the challenge generator 301c twice, referred to as "Run #1" and "Run #2". In an example of the first test case, the challenge generator 301c, exemplarily illustrated in FIG. 3, generates "3" as the challenge content that will be presented after 19 seconds from the start of the multimedia content for a duration of 3 seconds. The challenge generator 301c then generates "2" as the challenge content that will be presented after 26 seconds from the start of the multimedia content for a duration of 3 seconds. The challenge generator 301c also generates the coordinates (233, 8) and (29, 134) as the locations for presenting the challenge content "3" and "2" respectively, wherein the coordinates are selected within the video display frame. In an example of the second test case, the challenge generator 301c generates "7" as the challenge content that will be presented within the first 10 second segment, then generates "2" as the challenge content that will be presented within the second 10 second segment, and generates "9" as the challenge content that will be presented within the third 10 second segment. The challenge generator 301c also generates the coordinates (89, 16), (58, 171), and (151, 109) as the locations for presenting the challenge content "7", "2", and "9" respectively, wherein the coordinates are selected within the video display frame.

It will be readily apparent that the various methods and algorithms disclosed herein may be implemented on computer readable media appropriately programmed for general purpose computers and computing devices. As used herein, the term "computer readable media" refers to non-transitory computer readable media that participate in providing data, for example, instructions that may be read by a computer, a processor or a like device. Non-transitory computer readable media comprise all computer readable media, for example, non-volatile media, volatile media, and transmission media, except for a transitory, propagating signal. Non-volatile media comprise, for example, optical disks or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire and fiber optics, including wires that constitute a system bus coupled to a processor. Common forms of computer readable media comprise, for example, a floppy disk, a flexible disk, a hard disk, magnetic tape, any other magnetic medium, a compact disc-read only memory (CD-ROM), a digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read. A "processor" refers to any one or more microprocessors, central processing unit (CPU) devices, computing devices, microcontrollers, digital signal processors or like devices. Typically, a processor receives instructions from a memory or like device and executes those instructions, thereby performing one or more processes defined by those instructions. Further, programs that implement such methods and algorithms may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of languages that can be used comprise C, C++, C#, Perl, Python, or JAVA. The computer program codes or software programs may be stored on or in one or more mediums as object code. The computer program product disclosed herein comprises computer executable instructions embodied in a non-transitory computer readable storage medium, wherein the computer program product comprises computer program codes for implementing the processes of various embodiments.

Where databases are described such as the media database 302d, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviors of a database can be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

The present invention can be configured to work in a network environment including a computer that is in communication with one or more devices via a communication network. The computer may communicate with the devices directly or indirectly, via a wired medium or a wireless medium such as the Internet, a local area network (LAN), a wide area network (WAN) or the Ethernet, token ring, or via any appropriate communications means or combination of communications means. Each of the devices may comprise computers such as those based on the Intel® processors, AMD® processors, UltraSPARC® processors, Sun® processors, IBM® processors, etc., that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

1. A computer implemented method for confirming that a viewer viewed multimedia content on a client device, comprising:
   receiving said multimedia content from a server and playing said multimedia content on a display screen of said client device, wherein said multimedia content is uploaded on said server by a multimedia content owner;
   generating a challenge stream by a challenge generator, said challenge stream comprising a plurality of challenges, wherein content of each of said challenges in said challenge stream is random;
   integrating said challenge stream and a stream of said multimedia content in real time to generate a challenge, random in content, in real time for said multimedia content, wherein said challenge is random in content each time same said multimedia content is played on one or more client devices;
   presenting said challenge, random in content, to said viewer to confirm that said viewer viewed said multimedia content played on said display screen of said client device, by displaying said challenge, random in content, as an overlay on said multimedia content, wherein said challenge, random in content, is one or more of:
      unrelated to said multimedia content;
      presented at random times comprising one of during play of said multimedia content, after said play of said multimedia content, and a combination thereof; and
      presented at random physical locations on said multimedia content;
   invoking a response from said viewer for said presented challenge;
   confirming said multimedia content was viewed by said viewer if said response entered by said viewer in said client device for said presented challenge indicates a correct response;
   generating a response report based on said response from said viewer; and
   crediting said viewer with an item of value and debiting a fee from said multimedia content owner, if said response report confirms said multimedia content was viewed by said viewer.

2. The computer implemented method of claim 1, wherein said challenge, random in content, comprises one or more of a random number, a random icon, a random shape, a product logo, a service logo, a random color, a random mathematical equation, and a random target on said display screen of said client device for said viewer to interact therewith using one of touch and a pointing device.

3. The computer implemented method of claim 1, wherein said challenge, random in content, is presented at one or more times during and/or after said play of said multimedia content.

4. The computer implemented method of claim 1, wherein challenge content is optionally unrelated to said multimedia content.

5. The computer implemented method of claim 1, wherein said challenge, random in content, changes for each viewing of said multimedia content.

6. The computer implemented method of claim 1, further comprising determining duration of said play of said multimedia content, wherein said challenge, random in content, is presented during and/or after said duration of said play of said multimedia content.

7. The computer implemented method of claim 1, further comprising presenting another said challenge, random in content, to said viewer if said response from said viewer to said presented challenge is incorrect.

8. The computer implemented method of claim 1, wherein said challenge, random in content, is one or more random numbers presented at different points in time, and wherein said response by said viewer to said challenge, random in content, is a reproduction of said one or more random numbers by entering said one or more random numbers into said client device.

9. The computer implemented method of claim 1, wherein said challenge, random in content, is a random geometrical shape presented at different points in time, and wherein said response by said viewer to said challenge, random in content, is a selection of an option representing said geometrical shape from an options list.

10. The computer implemented method of claim 1, wherein said challenge, random in content, is a random mathematical equation, and wherein said response by said viewer to said challenge, random in content, is provided by entering a result of said mathematical equation into said client device.

11. The computer implemented method of claim 1, wherein said challenge, random in content, is a random icon, and wherein said response by said viewer to said challenge, random in content, is a selection of an option representing said icon from an options list.

12. The computer implemented method of claim 1, wherein said challenge, random in content, is one of a product logo and a service logo, and wherein said response by said viewer to said challenge, random in content, is a selection of an option representing said product logo and said service logo from an options list.

13. The computer implemented method of claim 1, further comprising presenting one or more challenges, random in content, at one or more times during and/or after said play of said multimedia content.

14. The computer implemented method of claim 13, further comprising transferring a response to each of said one or more challenges, random in content, from said viewer to one or more random locations on one of said display screen of said client device and a multimedia player frame within said display screen of said client device, during said play of said multimedia content, wherein each said response of said viewer is automatically registered on said one of said display screen of said client device and said multimedia player frame within said display screen of said client device at the end of said play of said multimedia content.

15. The computer implemented method of claim 1, wherein said response is invoked from said viewer at the end of said play of said multimedia content.

16. The computer implemented method of claim 1, further comprising requesting said viewer to provide a response to said challenge, random in content, within a predetermined period of time after said challenge, random in content, is presented.

17. The computer implemented method of claim 1, wherein said multimedia content comprises one or more of an advertisement, a commercial message, an educational clip, and an entertainment clip.

18. The computer implemented method of claim 1, wherein said challenge, random in content, appears randomly on a multimedia player frame within said display screen of said client device.

19. The computer implemented method of claim 18, wherein said challenge, random in content, appears immediately outside a boundary of said multimedia player frame and scrolls in one of an upward direction and a downward direction on either side of said multimedia player frame.

20. The computer implemented method of claim 18, wherein said challenge, random in content, appears immediately outside a boundary of said multimedia player frame and scrolls in one of a rightward direction and a leftward direction of said multimedia player frame, in one of a region above and a region below said multimedia player frame.

21. The computer implemented method of claim 18, wherein said challenge, random in content, appears at a number of unique positions within said multimedia player frame based on physical coordinates selected within said multimedia player frame.

22. A computer implemented method for confirming that a viewer viewed multimedia content on a client device, comprising:
   receiving said multimedia content from a server and playing said multimedia content on a display screen of said client device, wherein said multimedia content is uploaded on said server by a multimedia content owner;
   generating a challenge stream by a challenge generator, said challenge stream comprising a plurality of challenges, wherein content of each of said challenges in said challenge stream is random;
   integrating said challenge stream and a stream of said multimedia content in real time to generate a challenge, random in content, in real time for said multimedia content, wherein said challenge is random in content each time same said multimedia content is played on one or more client devices;
   interrupting said play of said multimedia content after an interrupt time period for presenting said challenge, random in content, to said viewer, wherein said interrupt time period is less than duration of said multimedia content, and wherein said challenge, random in content, is presented to said viewer by overlaying said challenge, random in content, on said multimedia content, wherein said challenge, random in content, is one or more of:
      unrelated to said multimedia content;
      presented at random times comprising one of during play of said multimedia content, after said play of said multimedia content, and a combination thereof; and
      presented at random physical locations on said multimedia content;
   invoking a response from said viewer for said presented challenge;
   confirming said multimedia content was viewed by said viewer if said response is entered by said viewer in said client device for said presented challenge;
   generating a response report based on said response from said viewer; and
   crediting said viewer with an item of value and debiting a fee from said multimedia content owner, if said response report confirms said multimedia content was viewed by said viewer.

23. A computer implemented method for confirming that a viewer viewed multimedia content on a client device, comprising:
   receiving said multimedia content from a server and playing said multimedia content on a display screen of said client device, wherein said multimedia content is uploaded on said server by a multimedia content owner;
   generating a challenge stream by a challenge generator, said challenge stream comprising a plurality of challenges, wherein content of each of said challenges in said challenge stream is random;
   integrating said challenge stream and a stream of said multimedia content in real time to generate a challenge, random in content, in real time for said multimedia content, wherein said challenge is random in content each time same said multimedia content is played on one or more client devices;
   presenting said challenge, random in content, to said viewer to confirm that said viewer viewed said multimedia content played on said display screen of said client device, by displaying said challenge, random in content, as an overlay on said multimedia content, wherein said challenge, random in content, is unrelated to said multimedia content;
   invoking a response from said viewer for said presented challenge;
   confirming said multimedia content was viewed by said viewer if said response is entered by said viewer in said client device for said presented challenge;
   generating a response report based on said response from said viewer; and
   crediting said viewer with an item of value and debiting a fee from said multimedia content owner, if said response report confirms said multimedia content was viewed by said viewer.

24. A computer implemented method for confirming that a viewer viewed multimedia content on a client device, comprising:
   receiving said multimedia content from a server and playing said multimedia content on a display screen of said client device, wherein said multimedia content is uploaded on said server by a multimedia content owner;
   generating a challenge stream by a challenge generator, said challenge stream comprising a plurality of challenges, wherein content of each of said challenges in said challenge stream is random;
   integrating said challenge stream and a stream of said multimedia content in real time to generate a challenge, random in content, in real time for said multimedia content, wherein said challenge is random in content each time same said multimedia content is played on one or more client devices;
   presenting said challenge, random in content, to said viewer to confirm that said viewer viewed said multimedia content played on said display screen of said client device, by displaying said challenge, random in content, as an overlay on said multimedia content, wherein said challenge, random in content, is presented at random times comprising one of during play of said multimedia content, after said play of said multimedia content, and a combination thereof;
   invoking a response from said viewer for said presented challenge;
   confirming said multimedia content was viewed by said viewer if said response is entered by said viewer in said client device for said presented challenge;

generating a response report based on said response from said viewer; and crediting said viewer with an item of value and debiting a fee from said multimedia content owner, if said response report confirms said multimedia content was viewed by said viewer.

25. A computer implemented method for confirming that a viewer viewed multimedia content on a client device, comprising:

receiving said multimedia content from a server and playing said multimedia content on a display screen of said client device, wherein said multimedia content is uploaded on said server by a multimedia content owner;

generating a challenge stream by a challenge generator, said challenge stream comprising a plurality of challenges, wherein content of each of said challenges in said challenge stream is random;

integrating said challenge stream and a stream of said multimedia content in real time to generate a challenge, random in content, in real time for said multimedia content, wherein said challenge is random in content each time same said multimedia content is played on one or more client devices;

presenting said challenge, random in content, to said viewer to confirm that said viewer viewed said multimedia content played on said display screen of said client device, by displaying said challenge, random in content, as an overlay on said multimedia content, wherein said challenge, random in content, is presented at random physical locations on said multimedia content;

invoking a response from said viewer for said presented challenge;

confirming said multimedia content was viewed by said viewer if said response is entered by said viewer in said client device for said presented challenge;

generating a response report based on said response from said viewer; and crediting said viewer with an item of value and debiting a fee from said multimedia content owner, if said response report confirms said multimedia content was viewed by said viewer.

26. A computer implemented system for confirming that a viewer viewed multimedia content on a client device, comprising:

a server for providing multimedia content to said viewer, wherein said server comprises an upload module for uploading said multimedia content provided by a multimedia content owner on said server;

a client device in communication with said server via a network for receiving said multimedia content from said server and playing said multimedia content on a display screen of said client device;

a view confirmation module on one of said server and said client device for confirming that said viewer viewed said multimedia content on said client device, wherein said view confirmation module comprises:

a challenge generator for generating a challenge stream, said challenge stream comprising a plurality of challenges, wherein content of each of said challenges in said challenge stream is random;

a challenge-response module for one or more of:

integrating said challenge stream and a stream of said multimedia content in real time to generate a challenge, random in content, in real time for said multimedia content, wherein said challenge is random in content each time same said multimedia content is played on said client device;

presenting said challenge, random in content, to said viewer to confirm that said viewer viewed said multimedia content played on said display screen of said client device, by displaying said challenge, random in content, as an overlay on said multimedia content;

invoking a response from said viewer for said presented challenge; and determining if said response is entered by said viewer for said presented challenge to confirm said multimedia content was viewed by said viewer;

a report generation module for generating a response report based on said response from said viewer; and a payment module for crediting said viewer with an item of value and debiting a fee from said multimedia content owner, if said response report confirms said multimedia content was viewed by said viewer.

27. The computer implemented system of claim 26, wherein said client device is one of an internet-enabled mobile device, a computer with a web browser, and a set top box capable of delivering interactive multimedia content.

28. The computer implemented system of claim 26, wherein said challenge, random in content, comprises one or more of a random number, a random icon, a random shape, a product logo, a service logo, a random color, a random mathematical equation, and a random target on said display screen of said client device for said viewer to interact therewith using one of touch and a pointing device, wherein said challenge, random in content, is one or more of unrelated to said multimedia content, presented at random times comprising one of during play of said multimedia content, after said play of said multimedia content, and a combination thereof, and presented at random physical locations on said multimedia content.

29. The computer implemented system of claim 26, wherein said challenge-response module presents one or more challenges, random in content, at one or more times during and/or after play of said multimedia content.

30. The computer implemented system of claim 29, wherein said challenge-response module transfers a response to each of said one or more challenges, random in content, from said viewer to one or more random locations on one of said display screen of said client device and a multimedia player frame within said display screen of said client device, during said play of said multimedia content, wherein said challenge-response module automatically registers each said response of said viewer on said one of said display screen of said client device and said multimedia player frame within said display screen of said client device at the end of said play of said multimedia content.

31. The computer implemented system of claim 26, wherein said client device further comprises a timer for ensuring that said viewer provides said response to said challenge, random in content, within a predetermined period of time after said challenge, random in content, is presented.

32. The computer implemented system of claim 31, wherein said timer counts an interrupt time period for interrupting said playing of said multimedia content and presenting said challenge, random in content, to said viewer, wherein said interrupt time period is less than duration of said multimedia content.

33. A computer program product comprising computer executable instructions embodied in a non-transitory computer readable storage medium, wherein said computer program product comprises:

a first computer program code for receiving multimedia content from a server and playing said multimedia content on a display screen of a client device, wherein said multimedia content is uploaded on said server by a multimedia content owner;

a second computer program code for generating a challenge stream, said challenge stream comprising a plurality of challenges, wherein content of each of said challenges in said challenge stream is random;

a third computer program code for integrating said challenge stream and a stream of said multimedia content in real time to generate a challenge, random in content, in real time for said multimedia content, wherein said challenge is random in content each time same said multimedia content is played on said client device;

a fourth computer program code for presenting said challenge, random in content, to said viewer to confirm said viewer viewed said multimedia content played on said display screen of said client device, by displaying said challenge, random in content, as an overlay on said multimedia content, wherein said challenge, random in content, is one or more of:

unrelated to said multimedia content;

presented at random times comprising one of during play of said multimedia content, after said play of said multimedia content, and a combination thereof; and presented at random physical locations on said multimedia content;

a fifth computer program code for invoking a response from said viewer for said presented challenge;

a sixth computer program code for confirming said multimedia content was viewed by said viewer if said response is entered by said viewer in said client device for said presented challenge;

a seventh computer program code for generating a response report based on said response from said viewer; and an eighth computer program code for crediting said viewer with an item of value and debiting a fee from said multimedia content owner, if said response report confirms said multimedia content was viewed by said viewer.

* * * * *